United States Patent
Morishima

(10) Patent No.: US 7,224,646 B2
(45) Date of Patent: May 29, 2007

(54) METHOD OF FORMING IMAGE ON OPTICAL DISC BY RADIALY VIBRATING LASER BEAM UNDER FOCUS CONTROL

(75) Inventor: Morito Morishima, Fukuroi (JP)

(73) Assignee: Yamaha Corporation, Hamamatsu-Shi (JP)

( * ) Notice: Subject to any disclaimer, the term of this patent is extended or adjusted under 35 U.S.C. 154(b) by 261 days.

(21) Appl. No.: 10/447,736

(22) Filed: May 29, 2003

(65) Prior Publication Data

US 2004/0037176 A1 Feb. 26, 2004

(30) Foreign Application Priority Data

May 31, 2002 (JP) ............................. 2002-160485

(51) Int. Cl.
G11B 7/00 (2006.01)
(52) U.S. Cl. .................. 369/44.26; 369/47.5; 347/253
(58) Field of Classification Search .............. 369/44.26
See application file for complete search history.

(56) References Cited

U.S. PATENT DOCUMENTS

| 4,814,594 | A |   | 3/1989 | Drexler |
| 5,479,394 | A | * | 12/1995 | Yashima et al. ......... 369/275.1 |
| 5,509,991 | A |   | 4/1996 | Choi |
| 5,518,325 | A |   | 5/1996 | Kahle |
| 5,669,995 | A | * | 9/1997 | Hong ......................... 369/94 |
| 6,264,295 | B1 |  | 7/2001 | Bradshaw |
| 6,700,679 | B1 | * | 3/2004 | Fujita et al. ................ 358/1.9 |
| 2002/0191517 | A1 | * | 12/2002 | Honda et al. ............ 369/53.29 |

FOREIGN PATENT DOCUMENTS

EP 1110740 8/1999

(Continued)

OTHER PUBLICATIONS

LightScribe Direct Disc Labeling Announces New Licensees, XP-002321447, 2004 Hewlett-Packard Development Company, Jun. 2004.

(Continued)

Primary Examiner—Thang V. Tran
Assistant Examiner—Van T. Pham
(74) Attorney, Agent, or Firm—Morrison & Foerster LLP

(57) ABSTRACT

An optical disc recording apparatus can draw an image by radially vibrating a laser beam under stable focus control. A pickup radiates the laser beam onto the optical disc rotated by a spindle motor. A focus servo controller maintains a constant spot diameter of the laser beam on the optical disc by detecting a return light of the laser beam reflected back from the optical disc. An irradiation position controller operates when the pickup opposes a label face of the optical disc for controlling an irradiation trajectory of the laser beam to vibrate in a radial direction of the optical disc while the laser beam runs along circumferential zones defined on a coloring layer of the label face. A modulating section modulates an intensity of the laser beam for forming dots along the circumferential zones so as to draw the image.

13 Claims, 22 Drawing Sheets

FOREIGN PATENT DOCUMENTS

| | | |
|---|---|---|
| EP | 1 110 740 A1 | 6/2001 |
| EP | 1332884 | 1/2003 |
| EP | 1 332 884 A2 | 8/2003 |
| JP | 09265760 | 7/1997 |
| JP | 09-265760 | 10/1997 |
| JP | 2001-006223 | 1/1999 |
| JP | 2001-006223 | 7/1999 |
| JP | 2001-056937 | 2/2001 |

OTHER PUBLICATIONS

Morito Morishima, et al., "Optical Recording Apparatus With Drawing Capabiltiy of Visible Image on Disk Face", U.S. Appl. No. 10/282,671, filed Oct. 29, 2002.

"News Advisory: LightScribe Direct Disc Labeling Announces New Licensees, XP-002321447", Hewlett-Packard Company, Jun. 28, 2004, http://www.lightscribe.com/doc/Email_blast_6_28_04.pdf>.

* cited by examiner

<RECORDING FACE>

Prior Art

<LABEL FACE>

● INTERSECTIONS OF LASER BEAM IRRADIATION TRAJECTORY AND SPIRAL GROOVE

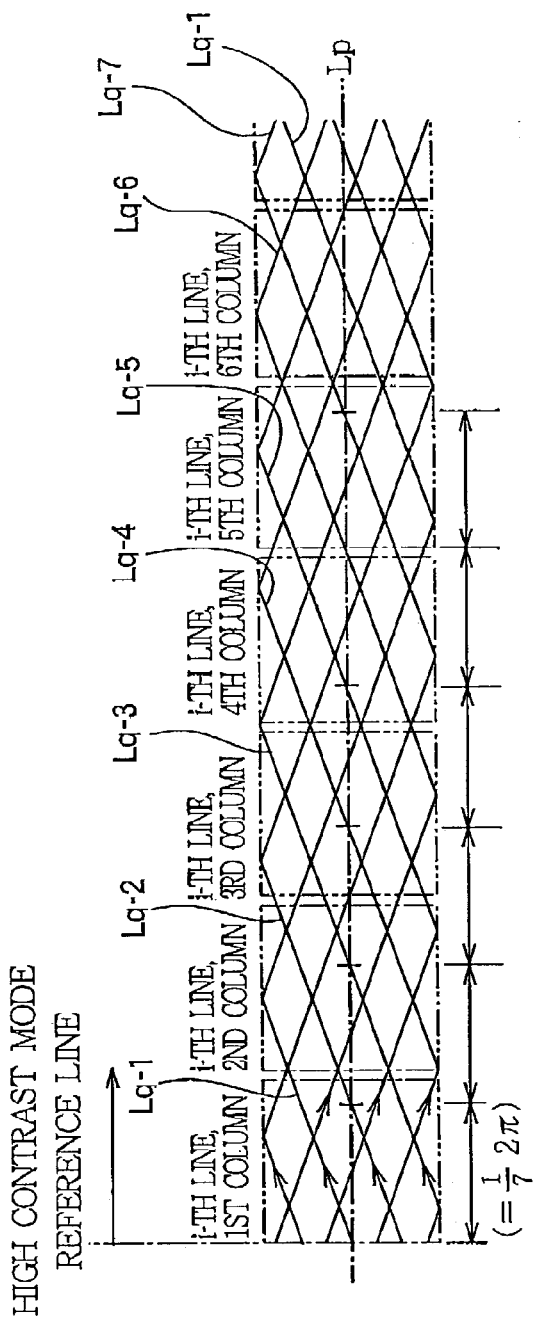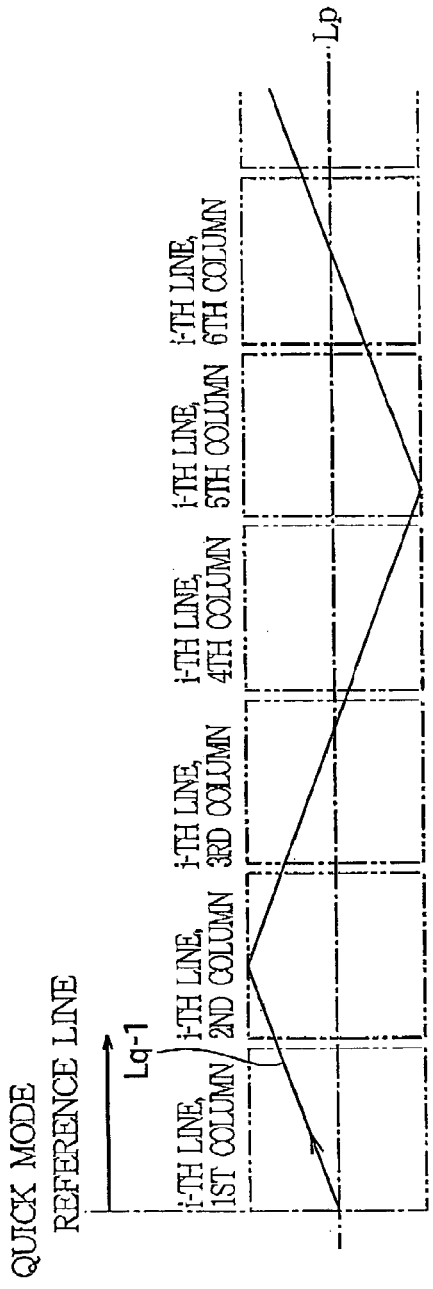

FIG.11

REFERENCE LINE ←---

<GRADATION DATA>

|  | 1ST COLUMN | 2ND COLUMN | 3RD COLUMN | 4TH COLUMN | 5TH COLUMN | 6TH COLUMN | 7TH COLUMN | ... | LAST n-TH COLUMN |
|---|---|---|---|---|---|---|---|---|---|
| LAST m-TH LINE | (000) | (000) | (000) | (000) | (000) | (000) | (000) | ... | (000) |
| : | : | : | : | : | : | : | : |  | : |
| 5TH LINE | (101) | (100) | (011) | (100) | (110) | (100) | (111) | ... | (100) |
| 4TH LINE | (000) | (000) | (000) | (000) | (000) | (000) | (000) | ... | (000) |
| 3RD LINE | (100) | (100) | (011) | (011) | (100) | (011) | (100) | ... | (011) |
| 2ND LINE | (000) | (100) | (100) | (000) | (001) | (010) | (000) | ... | (000) |
| 1ST LINE | (000) | (000) | (000) | (000) | (000) | (000) | (000) | ... | (000) |

FIG.12

<LASER BEAM ON/OFF TABLE>

| | \<GRADATION DATA\> | | | | | | | |
|---|---|---|---|---|---|---|---|---|
| | (000) | (001) | (010) | (011) | (100) | (101) | (110) | (111) |
| 1ST ROUND ① | OFF | ON | ON | ON | ON | ON | ON | ON |
| 2ND ROUND ② | OFF | OFF | ON | ON | ON | ON | ON | ON |
| 3RD ROUND ③ | OFF | OFF | OFF | ON | ON | ON | ON | ON |
| 4TH ROUND ④ | OFF | OFF | OFF | OFF | ON | ON | ON | ON |
| 5TH ROUND ⑤ | OFF | OFF | OFF | OFF | OFF | ON | ON | ON |
| 6TH ROUND ⑥ | OFF | OFF | OFF | OFF | OFF | OFF | ON | ON |
| 7TH ROUND ⑦ | OFF | OFF | OFF | OFF | OFF | OFF | OFF | ON |

FIG.17

| | j-TH COLUMN | j+1 (TH) COLUMN | j+2 (TH) COLUMN | j+3 (TH) COLUMN | j+4 (TH) COLUMN | j+5 (TH) COLUMN | j+6 (TH) COLUMN | j+7 (TH) COLUMN | j+8 (TH) COLUMN |
|---|---|---|---|---|---|---|---|---|---|
| i+8 (TH) LINE | (000) | (000) | (000) | (000) | (000) | (000) | (000) | (000) | (000) |
| i+7 (TH) LINE | (000) | (000) | (000) | (111) | (111) | (111) | (000) | (000) | (000) |
| i+6 (TH) LINE | (000) | (000) | (111) | (111) | (000) | (111) | (111) | (000) | (000) |
| i+5 (TH) LINE | (000) | (111) | (111) | (000) | (000) | (000) | (111) | (111) | (000) |
| i+4 (TH) LINE | (000) | (111) | (111) | (000) | (000) | (000) | (111) | (111) | (000) |
| i+3 (TH) LINE | (000) | (111) | (111) | (111) | (111) | (111) | (111) | (111) | (000) |
| i+2 (TH) LINE | (000) | (111) | (111) | (000) | (000) | (000) | (111) | (111) | (000) |
| i+1 (TH) LINE | (000) | (000) | (000) | (000) | (000) | (000) | (000) | (000) | (000) |
| i (TH) LINE | (000) | (000) | (000) | (000) | (000) | (000) | (000) | (000) | (000) |

<HIGH CONTRAST MODE>

•━━━• COLORED PORTION

FIG.20

| | j-TH COLUMN | j+1(TH) COLUMN | j+2(TH) COLUMN | j+3(TH) COLUMN | j+4(TH) COLUMN | j+5(TH) COLUMN | j+6(TH) COLUMN | j+7(TH) COLUMN |
|---|---|---|---|---|---|---|---|---|
| i+7(TH) LINE | (111) | (111) | (111) | (111) | (111) | (111) | (111) | (111) |
| i+6(TH) LINE | (110) | (110) | (110) | (110) | (110) | (110) | (110) | (110) |
| i+5(TH) LINE | (101) | (101) | (101) | (101) | (101) | (101) | (101) | (101) |
| i+4(TH) LINE | (100) | (100) | (100) | (100) | (100) | (100) | (100) | (100) |
| i+3(TH) LINE | (011) | (011) | (011) | (011) | (011) | (011) | (011) | (011) |
| i+2(TH) LINE | (010) | (010) | (010) | (010) | (010) | (010) | (010) | (010) |
| i+1(TH) LINE | (001) | (001) | (001) | (001) | (001) | (001) | (001) | (001) |
| i(TH) LINE | (000) | (000) | (000) | (000) | (000) | (000) | (000) | (000) |

FIG.22

⟨LASER BEAM ON/OFF TABLE⟩

| | GRADATION DATA | | | | | | | |
|---|---|---|---|---|---|---|---|---|
| | (000) | (001) | (010) | (011) | (100) | (101) | (110) | (111) |
| 1ST ROUND ① | OFF | ON | ON | ON | ON | ON | ON | ON |
| 2ND ROUND ② | OFF | OFF | OFF | OFF | OFF | ON | ON | ON |
| 3RD ROUND ③ | OFF | OFF | OFF | ON | ON | OFF | ON | ON |
| 4TH ROUND ④ | OFF | OFF | ON | OFF | OFF | ON | ON | ON |
| 5TH ROUND ⑤ | OFF | OFF | OFF | ON | OFF | ON | ON | ON |
| 6TH ROUND ⑥ | OFF | OFF | OFF | OFF | ON | ON | ON | ON |
| 7TH ROUND ⑦ | OFF | OFF | OFF | OFF | ON | OFF | OFF | ON |

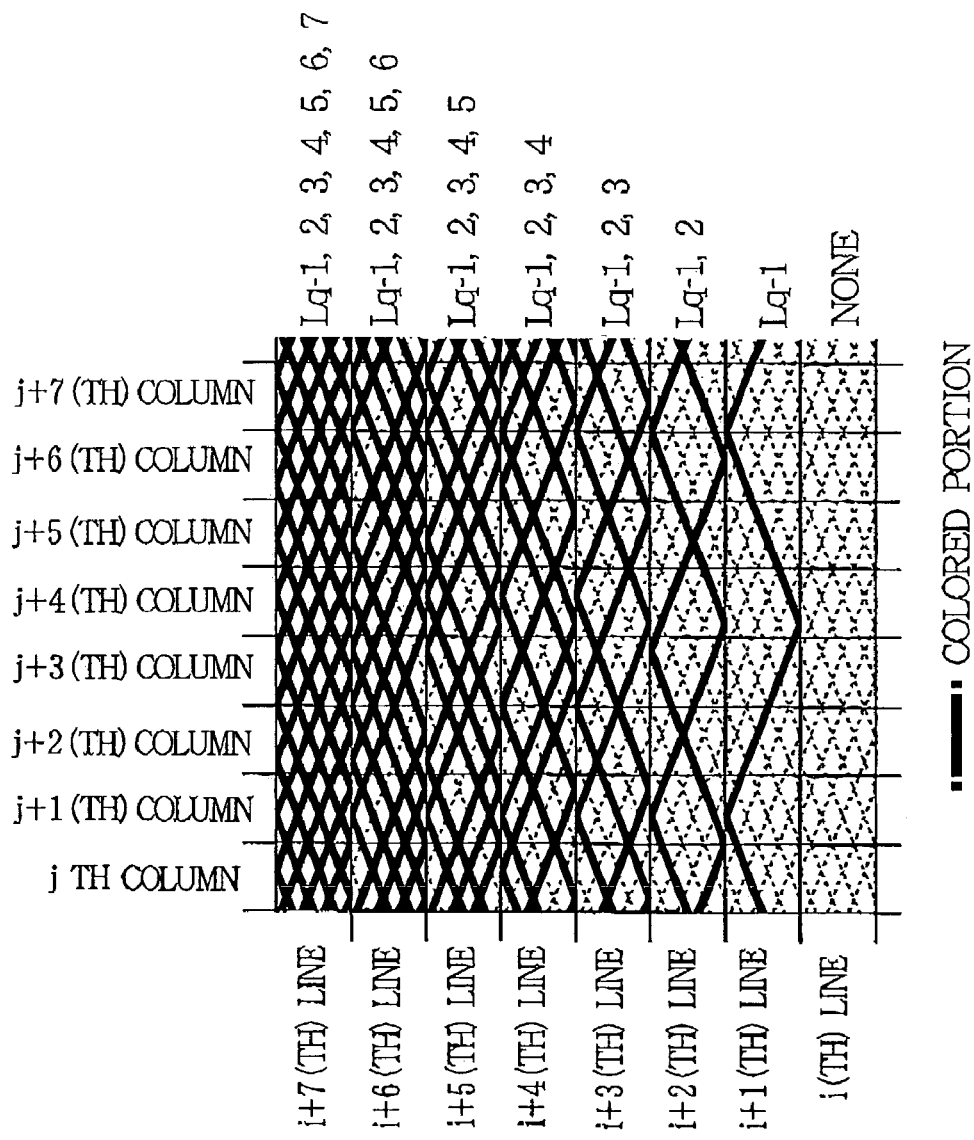

METHOD OF FORMING IMAGE ON OPTICAL DISC BY RADIALY VIBRATING LASER BEAM UNDER FOCUS CONTROL

BACKGROUND OF THE INVENTION

1. Technical Field of the Invention

The present invention relates to an optical disc recording apparatus for recording information in a recording layer provided on one surface of the optical disc and forming an image in a coloring layer provided on the other surface off the disc.

2. Description of the Related Art

Hitherto, recordable optical discs, such as a CD-R (Compact Disc-Recordable) and a CD-RW (Compact Disc-Rewritable) have been extensively used for recording a large amount of information. One surface (recording face) of this type of optical disc is provided with a recording layer, and information is recorded by radiating a laser beam to the recording layer according to the information to be recorded.

Meanwhile, in recent years, there has been proposed a technology in which a coloring layer that changes its color in response to heat or light is integrally provided with an optical disc, the coloring layer being provided on a label face opposite from the recording face to draw images in order to indicate the contents recorded on the optical disc. The label face is set to face an optical pickup, and a laser beam is radiated by the optical pickup to cause the coloring layer to change its color so as to form a visible image.

Such an optical disc will be explained with reference to the accompanying drawings. FIG. 4 is a side sectional view showing the construction of the optical disc. As shown in the drawing, an optical disc 200 has a structure in which a protective layer 201, a recording layer 202, a reflective layer 203, a protective layer 204, a thermo sensitive layer 205 and a protective layer 206 are deposited in this order. Among these layers, the recording layer 202 is formed of a groove (pit) 202a and a land 202b.

As shown in FIG. 6, the groove 202a observed from the recording face is spiraled clockwise from an inner circumference toward an outer circumference.

To record information on the optical disc 200, the recording face is set to oppose an object lens 114 of the optical pickup, as shown in FIG. 4, the optical disc 200 is turned counterclockwise as observed from the recording face, as shown in FIG. 6, tracking control is carried out to cause a laser beam B to follow along the groove 202a from an end point Gs on the inner circumference side, and the laser beam is radiated according to the information to be recorded, thereby recording the objective information. There are various types of tracking control, including one, for example, in which a laser beam is divided into a main beam and an auxiliary beam adjacent before or after the main beam in the radial direction, and the object lens 114 is swung to right or left such that both of return lights of the auxiliary beam coincide when a certain groove 202a is aligned with the center of the main beam. These tracking control methods are approximately the same in that the irradiation position of a laser beam is controlled so as to maintain the symmetry of the intensity distribution, including not only the return light in a certain groove 202a but also the return lights in the lands 202b located on both sides of the groove 202a.

Furthermore when information is recorded, focusing control is also carried out to maintain a constant distance between the object lens 114 and a disc surface even when the optical disc 200 is rotated, the control being accomplished by vertically moving the object lens 114 so as to follow a fluctuated vertical movement taking place as the optical disc 200 is rotated. There are various types of such focusing control, including one, for example, in which an optical system is disposed such that spot image formation of the return light reflected back by the optical disc 200 changes according to the distance with respect to the disc surface, and the object lens 114 is operated so as to maintain a constant condition of the spot image formation. These control methods are approximately the same in that the object lens 114 is operated to maintain the constant condition of the return light of the laser beam.

Meanwhile, to form an image on the optical disc 200, the optical disc 200 is set with its label face opposing the object lens 114 of the optical pickup, the optical disc 200 is rotated, and the laser beam B is applied to the optical disc 200 to perform main scanning by the relative movement as the optical disc 200 is rotated. At the same time, the optical pickup is moved from an inner circumference toward an outer circumference to cause the laser beam B to perform sub scanning. During the scanning, the laser beam B having an intensity that is sufficiently high to change the color of the thermo sensitive layer 205 is applied on the basis of dots (pixel data) so as to form an objective image.

When the optical disc 200 is set with its label face opposing the optical pickup, the tracking control becomes difficult for the reason described below.

First, when the optical disc 200 is set with its label face opposing the optical pickup, the concavo-convex relationship between the groove 202a and the land 202b observed from the object lens 114 side is reversed from that 2in the case where the optical disc 200 is set with its recording face opposing the optical pickup. If, therefore, the tracking control is to be conducted, a laser beam will follow the land 202b.

The material used for all the protective layers 201, 204 and 206 is polycarbonate having a refractive index of about 1.5. The protective layer 201 is considerably thicker than the protective layers 204 and 206. The recording layer 202 is at a point of about 1.2 mm as observed from the recording face, while it is at a point of only about 0.02 mm as observed from the label face.

The object lens 114 is designed so that it is focused (or a laser beam forms a spot having a predetermined diameter) on the reflective layer 203 (the recording layer 202) when it opposes the recording face to record information thereon. Hence, when the object lens 114 thus designed opposes the label face, the resulting detection range of its intensity distribution makes more extensive than the range applied when the object lens 114 is set to oppose the recording face. This will make it difficult to control the irradiation position of a laser beam to follow the land 202b. In addition, a laser beam is absorbed due to the coloration of the thermo sensitive layer 205, leading to temporarily reduced return light. This is another factor not expected to be encountered when the object lens 114 is set to oppose recording face, and contributes also to the difficulty of tracking control when the optical disc 200 is set with its label face opposing the optical pickup.

Thus, if the optical disc 200 is set with its label face opposing the optical pickup in order to form an image, normal tracking control cannot be expected. Rather, therefore, an image must be formed without using the tracking control.

However, in a state where the tracking control is disabled, if the optical disc 200 is, for example, eccentrically rotated around a point C2 slightly away from its central point C1, as shown in FIG. 7, then an irradiation trajectory Lp of a laser beam will be a circle with its center at the point C2. As a result, the circle intersects with the groove 202a having its center at the point C1 a plurality of times (five times in FIG. 7) for each rotation of the optical disc 200.

If a laser beam crosses over the groove 202a (or the land 202b), then the condition of the return light of the laser beam undesirably varies even when the distance to a disc surface remains constant. More specifically, the condition of the return light varies not only when the distance to the disc surface changes due to the rotation of the optical disc but also when the eccentric rotation causes the laser beam to cross over the groove 202a (or the land 202b). Furthermore, these two types of variations are both caused by the rotation of the optical disc 200, so that their frequency components are close to each other and relatively low.

Therefore, in the construction for controlling the focus of a laser beam so as to maintain a constant condition of return light, there is no discrimination between the variation attributable to a changed distance to a disc surface caused by the rotation of the optical disc 200 and the variation attributable to the laser beam crossing over the groove 202a or the like. This prevents normal focusing control. For instance, when an optical disc 200 that is ideally flat with no undulation is rotated, the distance between the optical disc 200 and the object lens 114 always remains constant; therefore, once a focus is fixed, then there should be no need to adjust the focus thereafter. If, however, a laser beam crosses over the groove 202a or the like due to eccentric rotation, then the condition of the return light changes. As a result, the focus is readjusted to cancel such a change, thus preventing the focusing control from being normally carried out.

Thus, if the focusing control feature fails to normally function, then the line width of the irradiation of a laser beam varies from one place to another, preventing uniformity from being maintained. This leads to deterioration in the quality of an image to be formed.

SUMMARY OF THE INVENTION

The present invention has been made with the aforesaid circumstances taken into account, and it is an object of the invention to provide an optical disc recording apparatus and an image forming method that allow focusing control to be normally conducted so as to prevent deterioration in the quality of an image to be formed even when an optical disc is set with its label face opposing an optical pickup to form an image.

To this end, an optical disc recording apparatus according to the present invention is characterized by being equipped with: a rotating section that is provided for rotating an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming an image in an array of dots arranged along circumferential zones which are defined by concentrically dividing the coloring layer; a light radiating section that is provided for radiating the laser beam onto the optical disc rotated by the rotating section; an irradiation position operating section that is provided for operating an irradiation position of the laser beam radiated onto the optical disc from the light radiating section; a focus operating section that is provided for operating a focus of the laser beam radiated to the optical disc from the light radiating section; a focus controlling section that is provided for controlling the focus operating section so as to maintain a constant spot diameter of the laser beam on the optical disc by detecting a return light of the laser beam reflected back from the optical disc; an irradiation position controlling section that is provided for controlling the irradiation position operating section, the irradiation position controlling section being operative when the light radiating section opposes the one surface of the optical disc for controlling the laser beam radiated by the light radiating section to track the spiral groove in the recording layer on the one surface, and being operative when the light radiating section opposes the other surface of the optical disc for controlling an irradiation trajectory of the laser beam to vibrate in a radial direction of the optical disc while the laser beam runs along the circumferential zones defined on the coloring layer; and a laser beam intensity modulating section being operative when the light radiating section opposes the one surface of the optical disc for modulating an intensity of the laser beam on the basis of the information to be recorded, and being operative when the light radiating section opposes the other surface of the optical disc for modulating the intensity of the laser beam on the basis of the dots along the circumferential zones so as to form the image.

With this arrangement, when the optical disc is set with the other surface opposing the light radiating section to form an image, the irradiation position of the laser beam vibrates in the radial direction of the optical disc, so that the laser beam crosses over nearby grooves in the recording layer very frequently while the optical disc is rotating. Hence, the variation component of the return light produced by crossing over the grooves in the recording layer is shifted to a higher frequency that does not interfere with the focusing control so that the variation component is ignored in the focusing control. This makes it possible to realize the focusing control that cancels only the net variation component attributable to a change in the distance to a disc surface.

BRIEF DESCRIPTION OF THE DRAWINGS

FIGS. 10(a) and 10(b), respectively, are diagrams for explaining laser beam irradiation trajectories.

FIG. 11 is a diagram for explaining contents stored in a frame memory.

FIG. 12 is a diagram for explaining a conversion table of a data converter in the recording apparatus.

FIG. 17 is a diagram for explaining an example of image contents stored in the frame memory.

FIG. 20 is a diagram for explaining an example of contents stored in the frame memory.

FIG. 22 is a diagram for explaining a conversion table of a data converter according to an application example of the recording apparatus.

FIG. 23 is a diagram for explaining an example of an image in the application example.

DETAILED DESCRIPTION OF THE INVENTION

The following will explain embodiments of the present invention with reference to the accompanying drawings.

<Optical Disc Recording Apparatus>

An optical disc recording apparatus according to this embodiment (hereinafter referred to simply as "the recording apparatus") has a newly added image forming feature for forming an image by radiating a laser beam to a coloring layer that is provided on an optical disc and that changes its color in response to heat, in addition to a general information recording feature for recording information by radiating a laser beam to a recording face of the optical disc. The construction of the optical disc itself has already been described; therefore, the descriptions will be given to the construction of the recording apparatus that records information and forms images on the optical disc. The feature for reading out recorded information uses a general technology, so that detailed explanation will be omitted.

<Construction of the Optical Disc Recording Apparatus>

Figure 1:
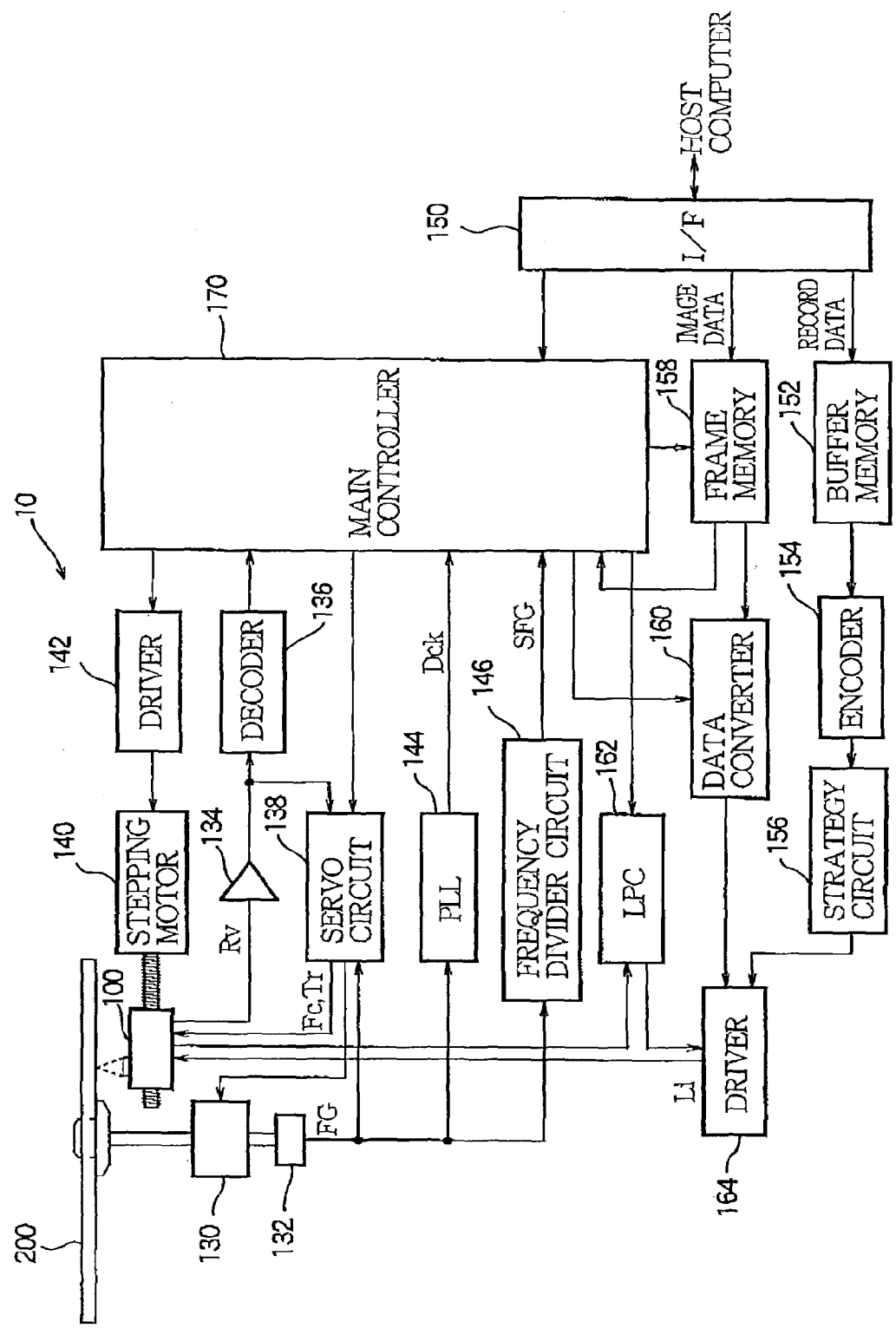
FIG. 1 is a block diagram showing a construction of an optical disc recording apparatus according to an embodiment of the present invention.

FIG. 1 is a block diagram showing the construction of the recording apparatus according to the embodiment. As shown in this drawing, a recording apparatus 10 is provided with an optical pickup 100, a spindle motor 130, a rotation detector 132, an RF (Radio Frequency) amplifier 134, a decoder 136, a servo circuit 138, a stepping motor 140, a motor driver 142, a PLL (Phase Locked Loop) circuit 144, a frequency divider circuit 146, an interface 150, a buffer memory 152, an encoder 154, a strategy circuit 156, a frame memory 158, a data converter 160, a laser power control (LPC) circuit 162, a laser driver 164 and a main controller 170. The recording apparatus 10 is connected to a host computer through the interface 150 among the above components.

The spindle motor 130 (rotating section) rotates the optical disc 200 on which information is recorded or images are formed. The rotation detector 132 is a type of frequency tacho-generator that utilizes, for example, the back electromotive current of the spindle motor 130 to output a signal FG having a frequency based on the rotational speed of the spindle.

The recording apparatus 10 according to this embodiment uses a CAV (Constant Angular Velocity) method to record information while forming an image. Accordingly, feedback control is carried out by the servo circuit 138 also as to set the rotational speed of the spindle motor 130 detected by the signal FG at the angular velocity specified by the major controller 170. The servo circuit 138 also carries out tracking control and focusing control on the optical pickup 100 in addition to the rotational control on the spindle motor 130.

Figure 2:
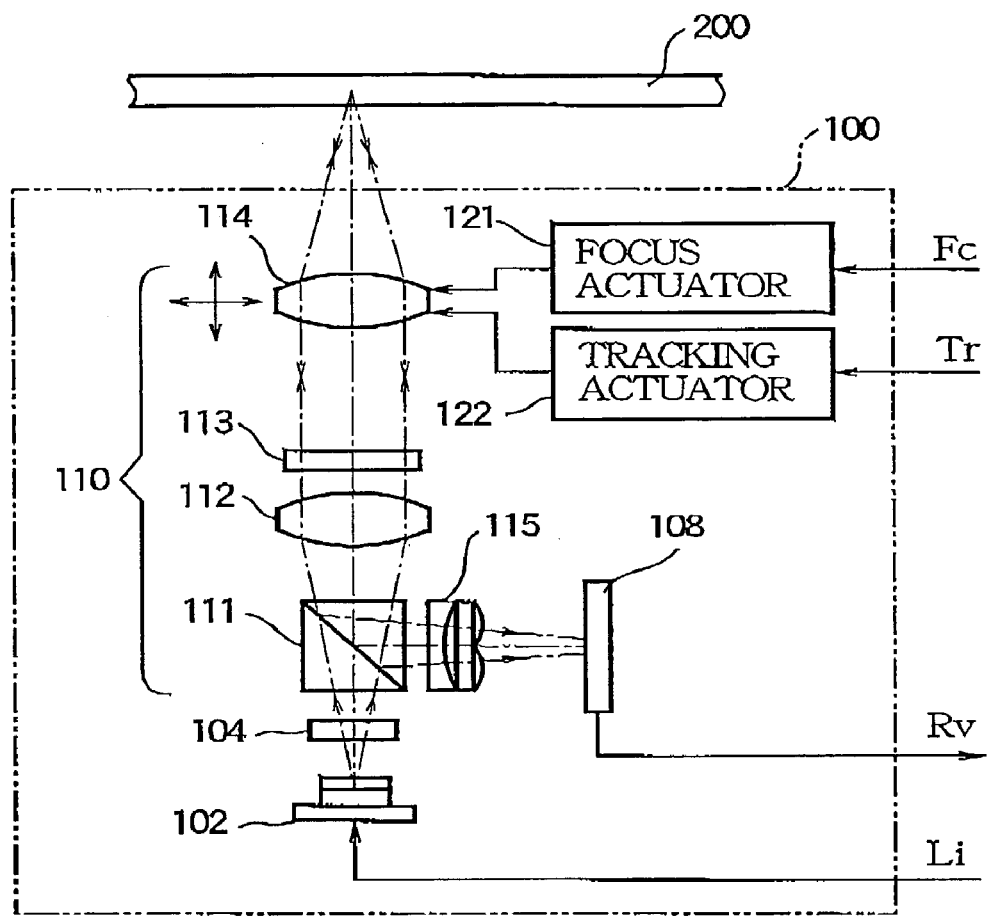
FIG. 2 is a block diagram showing a construction of an optical pickup in the optical disc recording apparatus.

The optical pickup 100 (the light radiating section) is a block radiating a laser beam to the optical disc 200 that is rotating, the detailed construction thereof being as shown in FIG. 2. As shown in the drawing, the optical pickup 100 includes a laser diode 102 that emits laser beams, a diffraction grating 104, an optical system 110 for condensing a laser beam onto the optical disc 200, and a light-receiving element 108 for receiving reflected (return) light.

The laser diode 102 is driven by a drive signal Liquid crystal from a laser driver 164 (refer to FIG. 1), and emits a laser beam at the intensity based on the current value thereof. The laser beam emitted from the laser diode 102 is separated into a main beam and two sub-beams by the diffraction grating 104, then the beams pass through a polarizing beam splitter 111, a collimator lens 112, a ¼ wavelength plate 113 and an object lens 114, which constitute an optical system 110, in order before they are condensed onto the optical disc 200.

Meanwhile, the three laser beams reflected off the optical disc 200 pass through the object lens 114, the ¼ wavelength plate 113, and the collimator lens 112 in order again. The laser beams axe reflected at the right angles through the polarizing beam splitter 111, and pass through a cylindrical lens 115 before entering the light-receiving element 108.

A light-receiving signal Rv by the light-receiving element 108 is amplified by the RF amplifier 134 (refer to FIG. 1), then supplied to the servo circuit 138 or the like. The light-receiving element 108 actually receives the main beam and the two sub-beams, respectively. A detection area for receiving the main beam in the light-receiving element 108 is divided into four sections, as it will be discussed hereinafter, and the light-receiving intensity of an optical image by the main beam is determined for each detection area. For this reason, the light-receiving signal Rv is a generic term of the signals indicating the light-receiving intensities.

The object lens 114 is retained by a focus actuator (focus operating section) 121 and a tracking actuator (irradiation position operating section) 122, and can be moved in the direction of the optical axis of a laser beam (the vertical direction) by the former and in the radial direction of the optical disc 200 (the horizontal direction) by the latter.

The details of the constructions of the components will be omitted. The focus actuator 121 vertically moves the object lens 114 in the optical axis direction by a focus coil, while the tracking actuator 122 horizontally moves the object lens 114 in the radial direction of the optical disc 200 by a tracking coll.

A focus signal Fc from the servo circuit 138 (refer to FIG. 1) is applied to both ends of the focus coil. Hence, the position of the object lens 114 with respect to the optical axis direction, that is, the distance between a disc surface and the object lens 114, is defined by the voltage of the focus signal Fc. In other words, the spot diameter of the laser beam applied to the optical disc 200 is determined by the voltage of the focus signal Fc.

Similarly, a tracking signal Tr from the servo circuit 138 is applied to both ends of the tracking coil, so that the irradiation position of the laser beam with respect to the radial direction of the optical disc 200 is defined by the voltage of the tracking signal Tr.

The optical pickup 100 has a front monitor diode (not shown), and receives the laser beam emitted by the laser diode 102, the current based on the light quantity thereof is supplied to a laser power control circuit 162 in FIG. 1.

The optical pickup is a block that includes these focus actuator 121 and the tracking actuator 122, and moves in the radial direction with respect to the optical disc 200 as a stepping motor 140 (a feeding section) revolves. The motor driver 142 supplies, to the stepping motor 140, a drive signal for moving the optical pickup 100 in the direction only for the amount, both being specified by the main controller 170.

The RF amplifier 134 amplifies the light-receiving signal Rv by the optical pickup 100 and supplies the amplified signal to the decoder 136 and the servo circuit 138. When recorded information is reproduced, the light-receiving signal Rv, which has been subjected to EFM (Eight to Fourteen Modulation), is subjected to EFM demodulation by the decoder 136 and supplied to the main controller 170.

Figure 4:
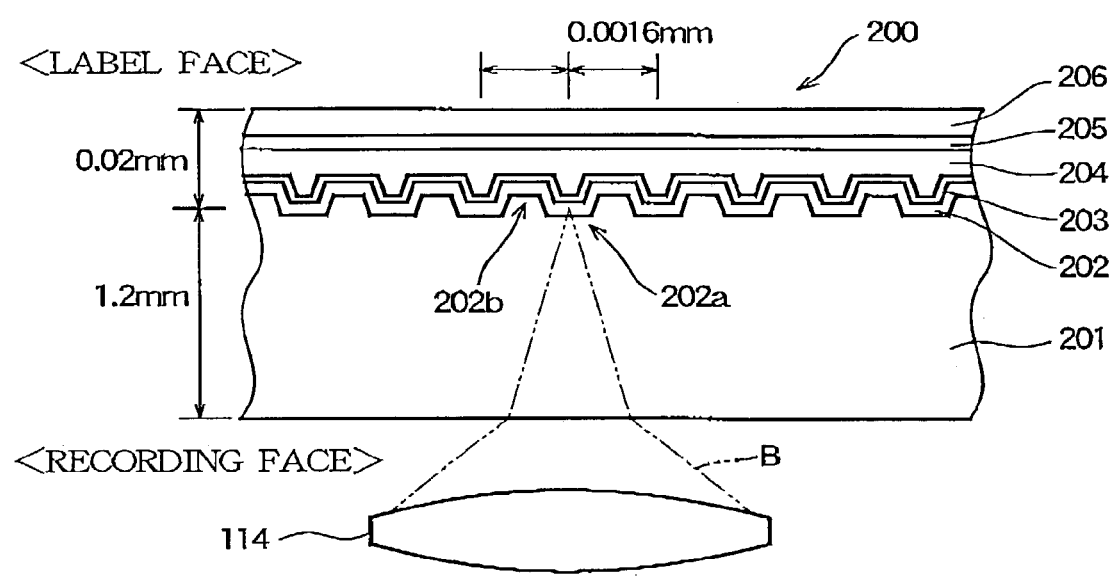
FIG. 4 is a sectional view showing a construction of an optical disc on which information is recorded or images are formed by the optical disc recording apparatus.

The main beam and the two sub-beams in the optical pickup 100 share a positional relationship in which, when the spot center of the main beam is positioned at the center of the groove 202*a* (refer to FIG. 4), one of the spots of the sub-beams reaches the inner surface of the groove 202*a* (the land 202*b*), while the other spot reaches the outer surface thereof (not shown). Therefore, whether the main beam is shifted to the inner side or the outer side of the objective groove 202*a* and the shifting amount (the tracking error amount) can be known by calculating the value of difference in light-receiving intensity between the sub-beams detected by the light-receiving element 108.

Therefore, when recording information, the servo circuit 138 (the irradiation position controlling section) generates a tracking signal Tr for reducing the shift amount in the shifting direction to zero to operate the tracking actuator 122. This allows the main beam to be accurately traced along the groove 202*a* even when the optical disc 200 eccentrically rotates (tracking control).

To carry out the control for moving the optical pickup 100 in the radial direction by the revolution of the stepping motor 140, the main controller 170 issues an instruction to move the optical pickup 100 outward by one step each time, for example, the optical disc 200 makes a predetermined number of rotations (thread control).

Thus, when recording information, the thread control is carried out to position the optical pickup 100 with respect to the optical disc 200, while the tracking control is carried out to make the laser beam emitted from the positioned optical pickup 100 trace the groove 202*a*.

However, when forming an image, the servo circuit 138 only generates the tracking signal Tr according to the instruction of the main controller 170 without conducting such tracking control, as it will be discussed hereinafter.

Figure 3:
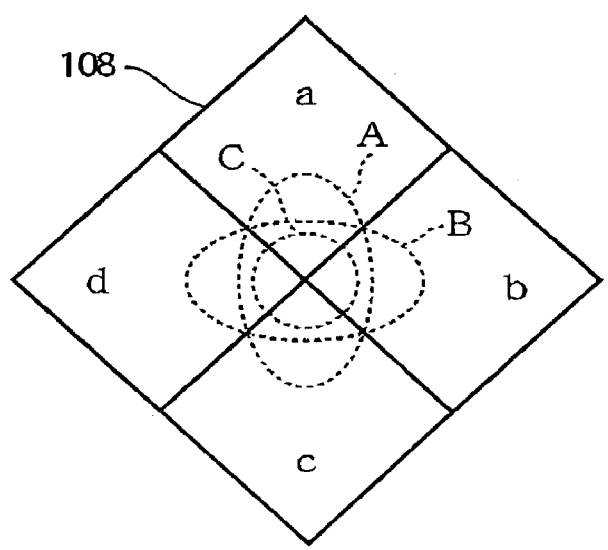
FIG. 3 is a top plan view showing a construction of a light receiving element in the optical pickup.

The detection area of the light-receiving element 108 is actually divided into four areas, a, b, c and d, as shown in FIG. 3. Meanwhile, the formed image of the main beam in the light-receiving element 108 turns into a vertical ellipse A if the object lens 114 is close to the optical disc 200, or into a horizontal ellipse B if the object lens 114 is far, or into a circle C in a focused state through a cylindrical lens 115.

Thus, by obtaining the calculation result of (a+c)−(b+d) based on the intensities of the received light in the four areas, it is possible to know whether the object lens 114 is shifted to a closer side or a farther side from the focused point with respect to the optical disc 200, and also to know the amount of the shift (the focus error amount).

When recording information, therefore, even if the optical disc 200 undulates during its rotation, the servo circuit 138 generates a focusing signal Fc that sets the foregoing calculation result to zero so as to allow focusing on the recording layer 202 to be achieved.

For the similar reason, when forming an image, it should be possible to maintain a fixed spot diameter of the laser beam applied to the thermo sensitive layer 205 by producing a focusing signal Pc that sets the calculation result to a constant value β (≠0) by the servo circuit 138.

However, as it has been described in the paragraph referring to the related art, when forming an image, it is difficult to implement the tracking control, so that the focusing control cannot be expected to be carried out because it can be implemented on condition that the tracking control is normally carried out.

More specifically, when the optical disc 200 is set with its label face opposing the optical pickup to form an image, the laser beam does not accurately trace the land 202*b*. Hence, when the optical disc 200 is eccentrically rotated, the irradiation trajectory of the laser beam crosses the groove 202*a* or the land 202*b*. When this happens, it is impossible to determine whether a change in the image formation of the light-receiving element 108 has been caused by a change in the distance to the disc surface or by intersecting the groove 202*a* or the like. As a result, the focusing control cannot be expected to work for maintaining a constant distance to the disc surface.

Figure 9:
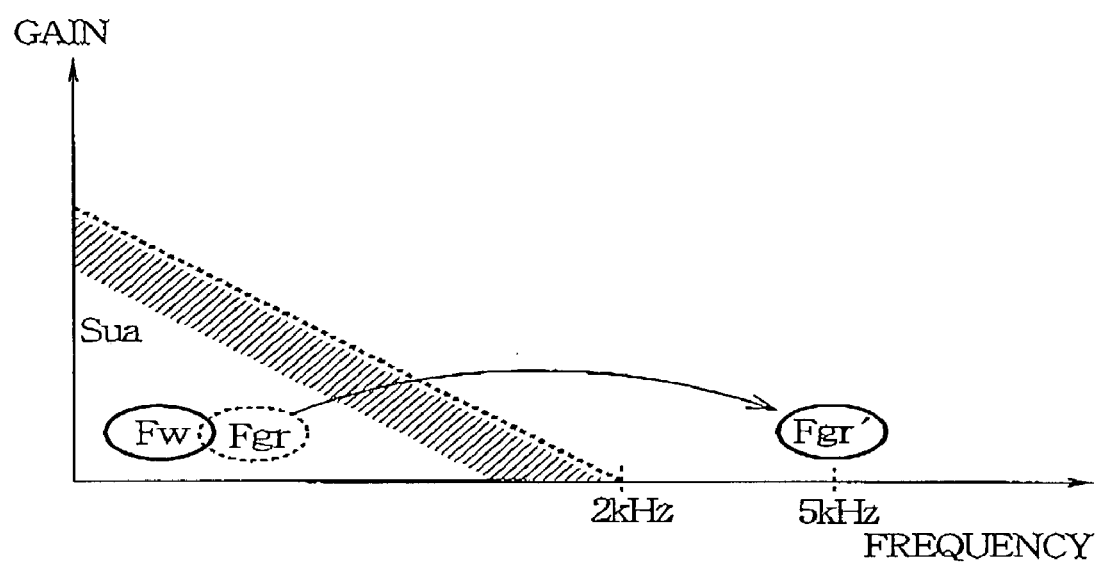
FIG. 9 is a diagram showing frequency/gain characteristics of focusing control.

This aspect will be explained in conjunction with FIG. 9. FIG. 9 is a diagram showing the loop characteristics of a focusing servomechanism required for recording information. The servo circuit 138 is designed to meet the characteristics When the optical disc 200 is set such that its label face faces against the optical pickup to form an image, the variable components of the return light of a laser bean are roughly classified into a variable component Fw attributable to a change in the distance to a disc surface caused by the rotation of the optical disc 200, and a variable component Fgr attributable to a laser beam striding the groove 202*a* or the like during eccentric rotation. These two types of variations are both due to the rotation of the optical disc 200, so that their frequency components are close to each other and low.

Accordingly, these two components remain in a range Sua covered by the focusing servomechanism, and the focusing control is undesirably engaged merely by the variable component Fgr attributable to the striding of the groove 202*a* or the like.

<Irradiation Trajectory of a Laser Beam>

Figure 8:
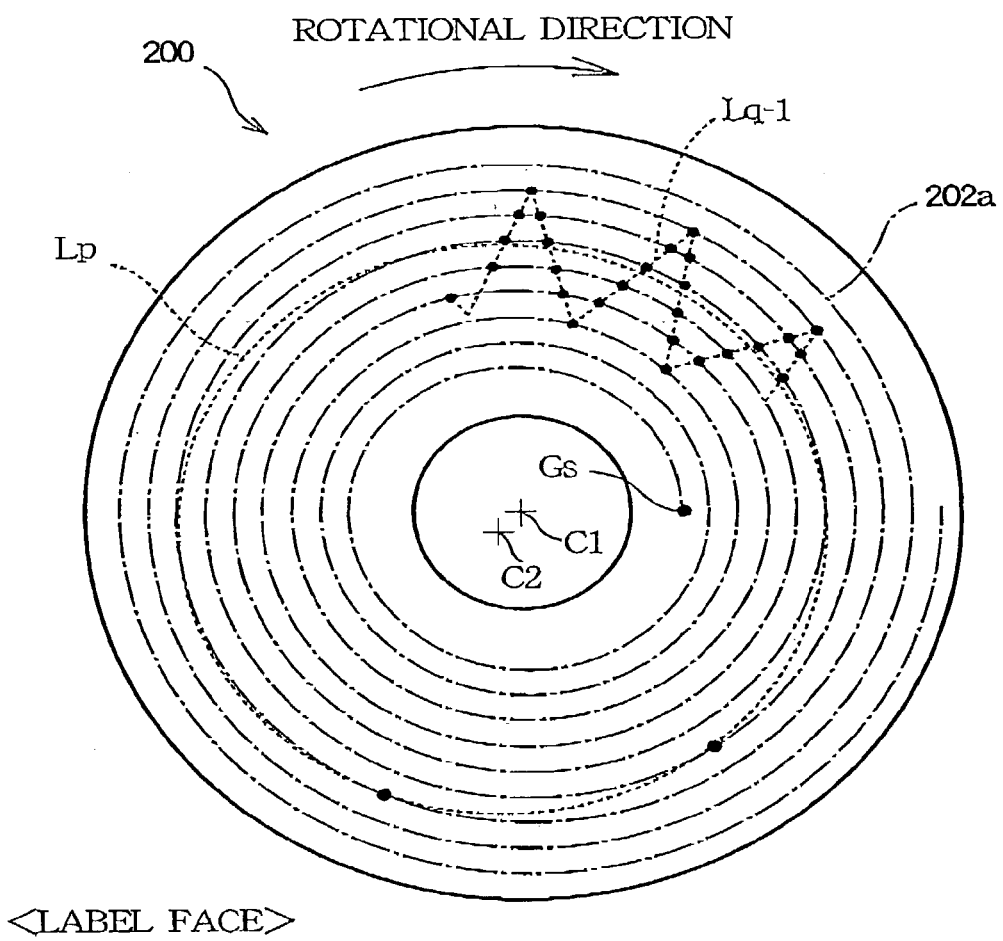
FIG. 8 is a diagram showing a relationship between the groove and a laser beam irradiation trajectory as observed from the label face of the optical disc.

This embodiment, therefore, adopts a configuration in which an AC signal, e.g., a triangular wave signal, is produced such that the irradiation position of a laser beam vibrates in the radial direction, as a tracking signal Tr when forming an image. Supplying such a triangular wave signal as the tracking signal Tr causes the laser beam to draw a track Lq-1, as shown in FIG. 8. More specifically, when the optical disc 200 eccentrically rotates around a point C2, the triangular waveform having a trajectory Lp of the central circle as its amplitude reference is produced, causing the laser beam to stride over the groove 202*a* or the like forcibly and frequently.

The frequent stride by the laser beam over the groove 202*a* or the like causes the variable component Fgr of the return light attributable to the frequent stride to be shifted to a higher frequency range at once beyond the range Sua covered by the focusing servomechanism, as shown in FIG. 9.

Figure 7:
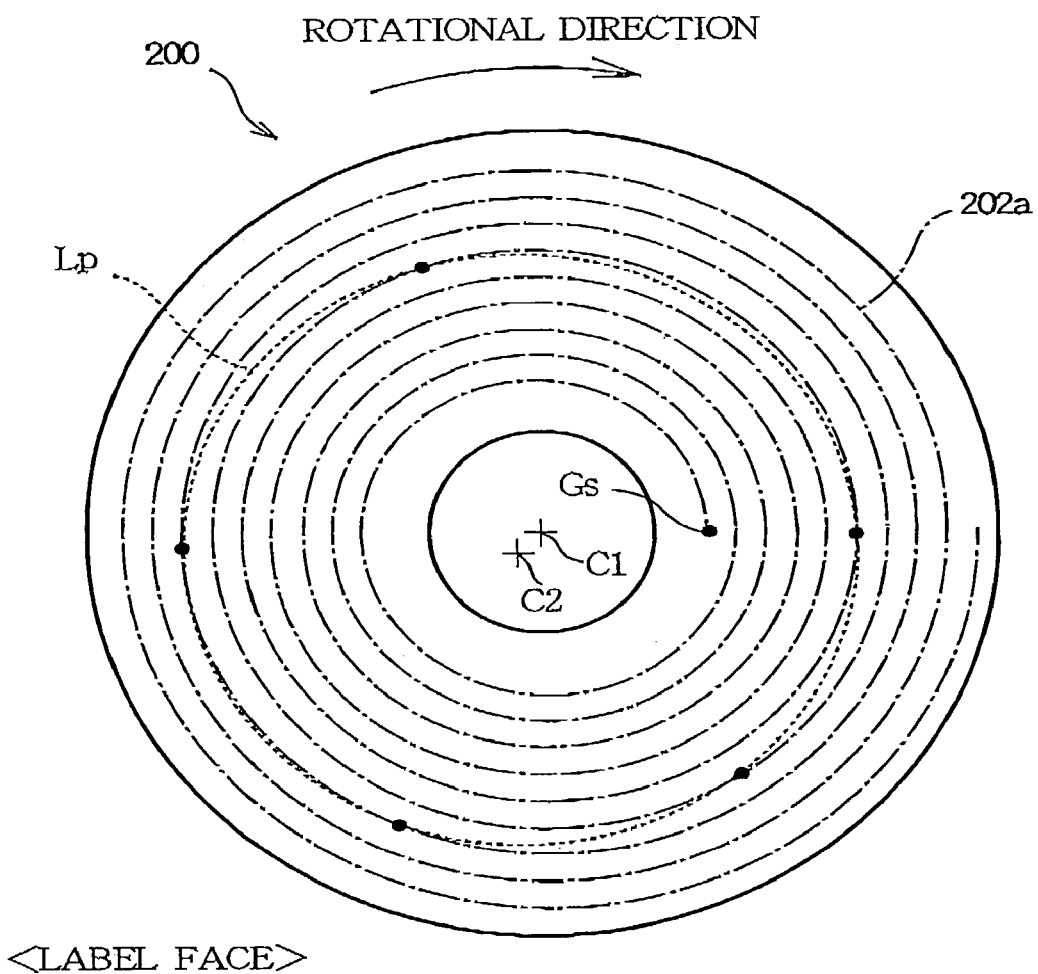
FIG. 7 is a diagram showing a relationship between the groove and a laser beam irradiation trajectory as observed from the label face of the optical disc.

For instance, when the number of rotations of the optical disc 200 per minute is 600, if no triangular wave signal is supplied as the tracking signal Tr, and if it is assumed that the laser beam strides over the groove 202a five times per rotation, as shown in FIG. 7, then the frequency of the variable component Fgr will be 50 Hz which is within the range Sua shown in FIG. 9. Hence, even if the disc surface is constant, the focusing control undesirably works to cancel the variable component Fgr and fails to normally function.

Meanwhile, if a triangular wave signal having a frequency of 40 Hz for causing vibration of a 0.1 mm width in the radial direction is supplied as an example of the tracking signal Tr, then the laser beam strides over the groove 202a five thousand times per second (=40×2×0.1/0.0016) if the influences by eccentric rotation are excluded, since the pitch of the groove 202a is 0.0016 mm(=1.6 μm).

Thus, when the foregoing triangular wave signal is supplied as the tracking signal Tr, the frequency of a variable component Fgr' obtained as the result of the laser beam striding over the groove 202a will be 5050 Hz, which reflects the added influences by the eccentric rotation. The resulting frequency is out of the Sua range in which the focusing servomechanism is valid, as shown in FIG. 9, thus being ignored in the focusing control.

Accordingly, even if a laser beam strides the groove 202a or the like, the focus signal Fc is produced so as to cancel only the variable component Fw attributable to a change in the distance to a disc surface. In this embodiment, therefore, it is possible for the focusing control feature to work so as to maintain a constant spot diameter of a laser beam applied to the thermo sensitive layer 205 by maintaining a constant distance to the disc surface, even if the tracking control feature does not work when forming an image.

As it will be explained below, when the irradiation trajectory of a laser beam is to be vibrated with a width of about 0.01 mm, which is substantially equal to the sub scanning pitch of a dot array, to form an image, the frequency of the triangular wave signal may be set to about 400 Hz.

FIG. 7 is intended to merely explain the state in which the irradiation trajectory of a laser beam crosses the groove 202a when the triangular wave signal is supplied as the tracking signal Tr, and does not accurately reflect the frequency and amplitude of the triangular wave signal or the pitch of the groove 202a.

If it is assumed that the direction in which the optical disc 200 rotates is defined as the main scanning direction and the radial direction as the sub scanning direction in forming images, then the only section available to accomplish the sub scanning of laser beam irradiation position for a required amount in the radial direction without using the tracking control feature is to move the optical pickup 100 by the revolution of the stepping motor 140.

If the minimum movement resolution of the stepping motor 140 for the optical pickup 100 is about 0.01 mm (=10 μm), then the minimum possible pitch in the sub scanning direction for forming images will be about 0.01 mm, which is the same as the above resolution.

Superficially, therefore, the purpose may be considered to be fulfilled by supplying a triangular wave signal as the tracking signal Tr and by carrying out the focusing control to adjust the spot diameter of the laser beam applied to the thermo sensitive layer 205 to about 0.01 mm, which is equal to the resolution, so as to define the intensity of a laser beam according to the dots of the image to be formed.

However, if the laser diode 102 designed such that its spot diameter is set to about 0.001 mm (=1 μm) when recording information is used to expand its spot diameter to about 0.01 mm when forming an image, then the intensity of irradiation to the thermo sensitive layer 205 per unit area deteriorates and sufficient coloration cannot be accomplished.

On the other hand, however, if a simple construction is used to radiate a laser beam having a spot diameter of about 0.001 mm to the thermo sensitive layer 205 and to carry out sub scanning by shifting the optical pickup 100 in the radial direction by about 0.01 mm, which is the minimum movement resolution, at a time, then the actually colored portion in one dot will be only a linear portion having a width of about 0.001 mm to which the laser beam has been applied, because the laser beam does not applied the remaining 90% of the portion of the dot, leaving it uncolored. Hence, the area of the colored portion in a dot having a lowest density occupies 0%, while the area of the colored portion in a dot having a highest density occupies only about 10%. The difference between these two dots is extremely small, possibly giving rise to a problem in that the contrast ratio in a formed image significantly lowers, resulting in deteriorated visibility.

In this embodiment, firstly, in order to form the dots for one line, the optical disc 200 is rotated (circularly moved) a plurality of times with the optical pickup 100 fixed. This, however, may cause irradiation trajectory of a laser beam applied to the optical disc 200 to remain unchanged for the plurality of circular rotations. To avoid this, secondly, the phase of the tracking signal Tr supplied as a triangular wave signal is changed for each round so that the laser beam irradiation trajectory changes for each round.

To be more specific, in this embodiment, as it will be discussed hereinafter, if an image is to be formed in eight gradations, then the optical disc 200 is given seven rounds to form the dots for one line. The main controller 170 instructs the servo circuit 138 to generate, as the tracking signal Tr, a triangular wave signal having its phase set to zero for the first round and then delayed by ($2\pi/7$) in sequence for the second round and after when the timing for passing a reference line is set to zero of a time axis.

When such tracking signal Tr is supplied to the tracking actuator 122, the irradiation trajectories of the laser beam to the optical disc 200 will be different from each other, track Lq-1 in the first round to track Lq-7 in the seventh round, as shown in FIG. 10(a).

In FIG. 10(a), a trajectory Lp denotes the laser beam irradiation trajectory obtained when the optical pickup 100 is positioned at a point corresponding to a certain one line among the dot arrays of the image to be formed and the voltage of the tracking signal Tr is presumptively fixed to zero, when the optical disc 200 is eccentrically rotated around a point C2. The trajectory Lp is actually an arc, as shown in FIG. 7 or FIG. 8. However, FIG. 10(a) shows a linear development for the convenience of explanation.

Referring back to FIG. 1, the buffer memory 152 stores the information supplied from a host computer through the intermediary of the interface 150, that is, the information to be recorded into the optical disc 200 (hereinafter referred to as "data to be recorded") in an FIFO (first in, first out) form.

The encoder 154 carries out the EFM modulation on the record data read from the buffer memory 152 and outputs it to a strategy circuit 156. The strategy circuit 156 carries out time axis correction processing or the like on the EFM signal supplied from the encoder 154, and outputs the result to the laser driver 164.

Meanwhile, the frame memory 158 accumulates the information supplied from the host computer through the intermediary of the interface 150, that is, the information to be formed on the optical disc 200 (hereinafter referred to as "image data").

Figure 5:
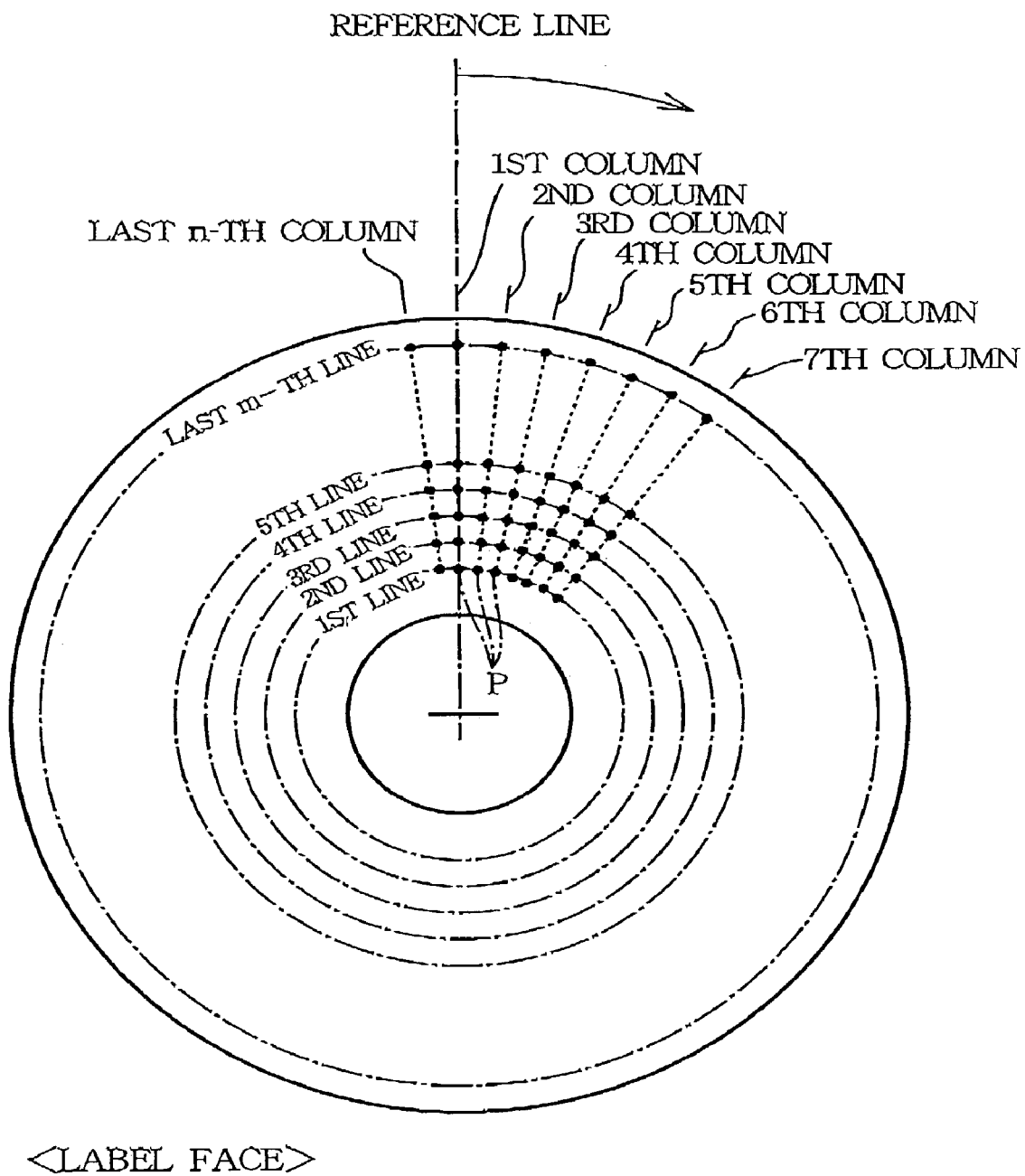
FIG. 5 is a diagram for explaining an dot array of an image to be formed on the optical disc.

The image data is a cluster of gradation data that defines the density of dots P to be drawn on the discoid optical disc 200. The individual dots P are arranged, corresponding to the intersections of the concentric circles of the optical disc 200 and the radial lines extending from the center, as shown in FIG. 5. Here, in order to explain the intersection coordinates in the optical disc 200, the concentric circles are defined as a first line, a second line, a third line, . . . , m-th (last) line in order from the inner circumferential side toward the outer circumferential side, and a certain radial line is defined as a reference line, the remaining radial lines are defined as a first column, a second column, a third column, . . . , n-th (last) column in clockwise order for convenience sake.

FIG. 5 is merely a schematic diagram to show the positional relationship among the dots P; actual dots are densely arranged. The same applies to the pitch of the groove 202a shown in FIG. 6 through FIG. 8.

Here, the arrangement of the dots has been conveniently defined, as described above, for the following reason.

Figure 6:
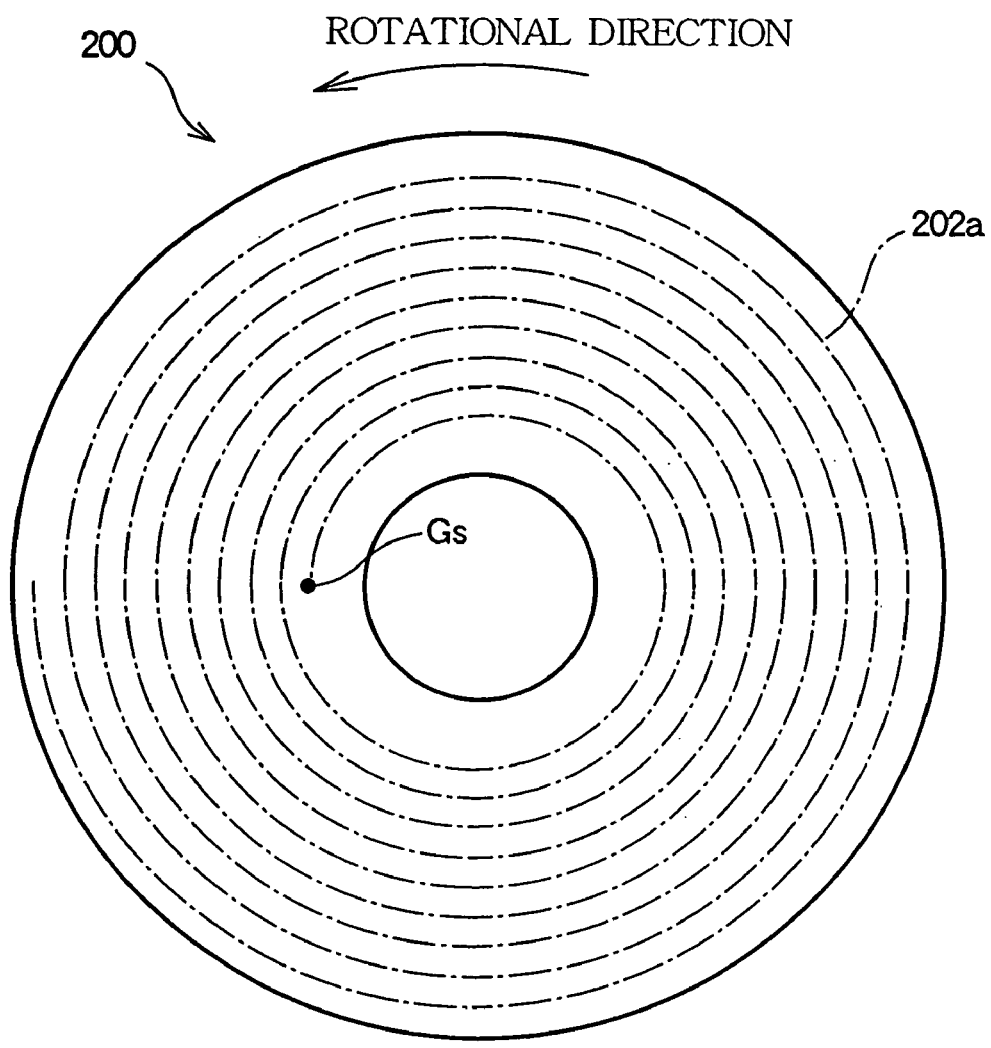
FIG. 6 is a top plan view showing a groove when the optical disc is observed from a recording face.

In general, the groove 202a of the optical disc 200 is spirally formed clockwise from the inner circumferential side when observed from the recording face, as shown in FIG. 6 described above. When recording information, tracing is required to begin at an end point Gs on the inner circumferential side of the groove 202a according to specifications; therefore, the optical disc 200 is rotated counter-clockwise, as observed from the recording face, while the optical pickup 100 moves from the inner circumferential side toward the outer side.

In this embodiment, based on the construction described above, when the optical disc 200 is rotated with its label face opposing the optical pickup 100, the main scanning is carried out by the rotation of the optical disc 200, while the sub scanning is carried out as the optical pickup 100 moves from the inner circumferential side toward the outer circumferential side thereby to form an image. Thus, regarding the relative movement of the optical disc 200 in relation to the optical pickup 100, the main scanning direction with respect to the optical disc 200 is the clockwise direction, which is opposite from the rational direction, as shown in FIG. 5.

When defined as described above, the frame memory 158 stores the gradation data on the basis of the arrays of m-th lines, n-th columns, as shown in FIG. 11. Here, in this embodiment, it is assumed that an image of 8 ($=2^3$) gradations per dot is formed, the gradation data being 3-bit. To be more specific, among the 3-bit the gradation data, (000) specifies a brightest (low) density, and the density grows darker (higher) in the order of (001), (010), (011), (100), (101), (110) and (111), the densities being thus specified to form dots.

The image data accumulated in the frame memory 158 is read as follows. When a particular line is specified by the main controller 170, the gradation data for the line is read at the same time and used for discrimination in the main controller 170. If the main controller 170 specifies a line and a column, then the gradation data at the position specified by the line and the column is read for one dot and supplied to the data converter 160.

The image data used in a host computer is usually of a bit map format. For this reason, to form an image in the optical disc 200, the image data in the bit map format may be converted into the coordinate system as shown in FIG. 5 by a host computer or the like, and the converted data may be accumulated in the frame memory 158, as shown in FIG. 7.

The main controller 170, a detailed illustration of which will be omitted, is constructed of a CPU (Central Processing Unit), a ROM (Read Only Memory), a RAM (Random Access Memory), etc. The component units are appropriately operated according to a program stored in a machine readable medium such as the ROM so as to control the recording of information on the recording face of the optical disc 200 and the formation of an image on the label face of the optical disc 200.

<Gradation Display>

As described above, in this embodiment, the irradiation trajectory of a laser beam differs for each round. Hence, the area ratio of a colored portion and an uncolored portion in a dot is changed by conducting control such that the thermo sensitive layer 205 is colored by radiating a laser beam in a certain round, while the layer is not colored in another round, thus making it possible to display a density.

To be more specific, in this embodiment, of the seven rounds required to form the dots for one line, a laser beam is radiated to cause the thermo sensitive layer 205 to color only for the number of rounds equivalent to decimal values of gradation data. For instance, if the gradation data is (101), then a laser beam having an intensity that is sufficiently high to color the thermo sensitive layer 205 is applied for five rounds out of the seven rounds so as to color the track portion. Similarly, if the gradation data is (011), then a laser beam having an appropriate intensity is applied for three rounds out of the seven rounds so as to color the track portion.

The data converter 160 (the laser beam intensity modulating section) is a major component unit for defining the intensity of a laser beam for each round until the seven rounds required to form the dots for one line, as described above. More specifically, in a high contrast mode, the data converter 160 converts the gradation data read from the frame memory 158 into ON data (bit) for setting a laser beam intensity to a write level or OFF data for setting it to a servo level on the basis of the number of rounds designated by the main controller 170 according to the table shown in FIG. 12. For example, if the gradation data read from the frame memory 158 is (010), then the data converter 160 converts the data into the ON data for a first round and a second round, and into the OFF data for a third round up to a seventh round, respectively, and outputs them. Thus, the target dot receives two shots of the laser beam at the first and second rounds.

Here, the write level is a value of irradiation intensity at which the thermo sensitive layer 205 is sufficiently colored, while the servo level is a value of irradiation intensity at which the thermo sensitive layer 205 is hardly colored. The reason for outputting a laser beam at the servo level intensity while the thermo sensitive layer 205 is not colored is to implement the focusing control and light amount control.

In a quick mode, which will be explained below, the data converter 160 converts all data into ON data if the gradation data read from the frame memory 158 is other than (000), while it converts into OFF data only If the gradation data is (000).

<Image Formation Mode>

According to such a method, it is necessary to make seven rounds to form the dots for one line. On the other hand, if the image to be formed is constructed of only characters, such as alphabets, symbols and numerals, it is not always necessary to form an image using multiple gradations or a high contrast ratio. Instead, just two gradations for ON/OFF mode may be adequate for some cases, and shortening the time required for forming an image may be more important than complete gradation display for some users.

This embodiment, therefore, has been configured to provide two modes, the high contrast mode for forming an image with a high contrast ratio and the quick mode for giving priority to a shorter time required for forming an image, thus allowing images to be formed in either mode.

Mode setting may be accomplished in various methods, including the following: (1) a host computer issues instructions to the main controller 170 through the intermediary of the interface 150, (2) the main controller 170 analyzes the gradation data accumulated in the frame memory 158 to prepare a histogram to make decisions based on the histogram, and (3) a user makes the setting through the intermediary of a separately provided selecting section.

Referring back to FIG. 1, the laser power control circuit 162 controls the intensity of the laser beams emitted from the laser diode 102 (refer to FIG. 2). To be more specific, the laser power control circuit 162 controls the current value of drive signal Li such that the value of the emitted light amount of the laser diode 102 detected by a front monitoring diode coincides with an optimum laser power target value supplied by the main controller 170.

Here, the embodiment uses the CAV system in which the angular velocity is constant, as mentioned above, so that the linear velocity increases toward the outer side of the optical disc 200. For this reason, the main controller 170 sets a higher target value of the write level as the optical pickup 100 is positioned farther outward of the optical disc 200.

The laser driver 164 generates the drive signal Li that reflects the control information supplied by the laser power control circuit 20 on the basis of the modulated data supplied from the strategy circuit 156 when recording information, or on the basis of the converted data supplied from the data converter 160 when forming an image, and the generated drive signal Li is supplied to the laser diode 102 of the optical pickup 100.

Thus, the intensity of the laser beam provided by the laser diode 102 is subjected to feedback control such that it coincides with a target value supplied from the main controller 170.

<Reference Line and Column Detection>

As described above, the rotation detector 132 outputs a frequency signal FG based on a spindle rotational speed. The PLL circuit 144 generates a clock signal Dck that synchronizes with the signal FG and has a frequency obtained by multiplying the frequency thereof, then supplies the clock signal Dck to the main controller 170. Furthermore, the frequency divider circuit 146 generates a reference signal SFG obtained by dividing the signal FG by a predetermined number and supplies the reference signal SFG to the main controller 170.

Figure 13:
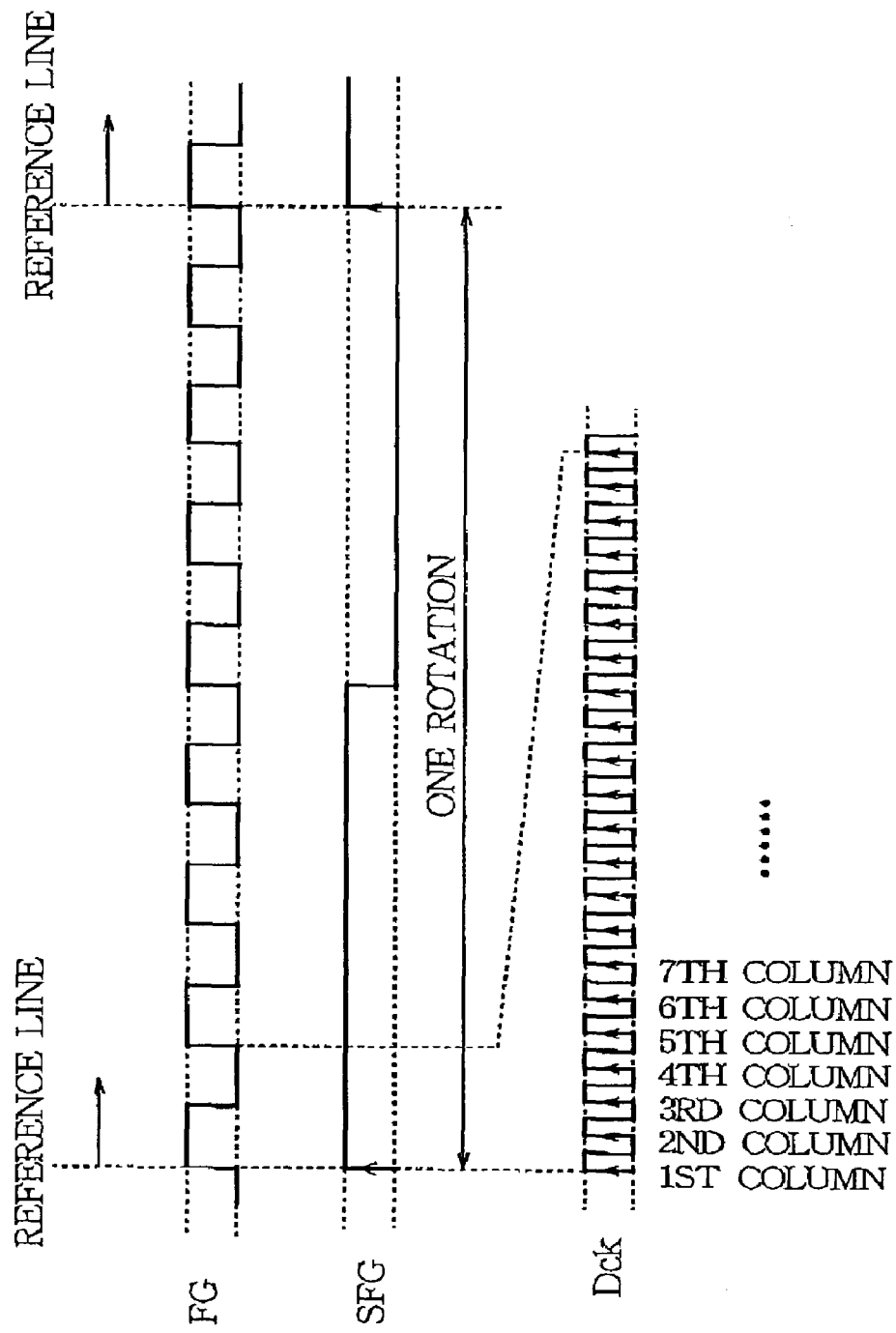
FIG. 13 is a timing chart for explaining the detection of a reference line and the detection of dot arrays of the optical disc.

Here, it it is assumed that, during the period of time in which the spindle motor 130 rotates once, that is, the optical disc 200 rotates once, the rotation detector 132 produces eight pulses as the signal FG, as shown in FIG. 13, then the frequency divider circuit 146 divides the frequency of the signal PG into one eighth, and outputs it as the reference signal SFG. This allows the main controller 170 to detect the timing at which the reference signal SFG rises as the timing at which the irradiation position of the laser beam of the optical pickup 100 passes the reference line of the optical disc 200.

In this case, if the multiplying rate of the frequency in the PLL circuit 144 is set to a value of a quotient obtained by dividing a column number n per line by 8, then one cycle of the clock signal Dck coincides with the period of time during which the optical disc 200 rotates by the angle equivalent to one column of dot arrays.

Accordingly, when forming an image, sequentially counting the rise timings of the clock signal Dck from the moment the reference signal SFG rises allows the main controller 170 to detect what number of column the laser beam irradiation of the optical pickup 100 is positioned from the point at which the laser beam irradiation passes the reference line of the optical disc 200.

To be more accurate, the expression "the reference line of the optical disc 200" should read "the reference line for the rotating shaft of the spindle motor 130." However, when recording information or forming an image, the optical disc 200 rotates while being chucked onto a table directly coupled to the rotating shaft, so that the reference line with respect to the rotating shaft of the spindle motor 130 maintains a constant positional relationship with respect to a certain radial line on the optical disc 200. Accordingly, as long as this condition is maintained, one radial line on the optical disc 200 may be referred to as the reference line of the optical disc 200.

In this embodiment, the timing at which the reference signal SFG rises is defined as the timing at which the optical disc 200 passes the reference line, and the timing at which the clock signal Dck rises is defined as the timing at which the optical disc 200 is rotated by the angle for one column of the dot arrays. Alternatively, however, fall timings may be used.

<Operation>

The operation of the recording apparatus 10 in accordance with this embodiment will be explained. The major feature of the recording apparatus 10 is to form images onto the optical disc 200. Furthermore, the recording apparatus 10 is characteristic in combining the conventional information recording feature and the image forming feature. First, the operation performed for implementing the information recording feature will be briefly explained, then the operation performed for implementing the image formatting feature, which is the major feature of the apparatus, will be explained in detail.

<Information Recording Operation>

First, to record information, the optical disc 200 is set with its recording face opposing the optical pickup 100, then the spindle motor 130 is subjected to the feedback control by the servo circuit 138 to obtain the angular velocity instructed by the main controller 170, as described above. Meanwhile, the optical pickup 100 is moved by the revolution of the stepping motor 140 to the point equivalent to an innermost circumference of the groove 202a.

When the tracing of the groove 202a is initiated by the tracking control, the record data stored in the buffer memory 152 is read out in the order in which it was recorded, subjected to the RFM modulation by the encoder 154, and subjected to the time axis correction processing or the like by the strategy circuit 156. Then, based on the EFM-modulated data, switching between the write level and the servo level is properly made, and control is carried out so as to cause the intensity to coincide with the target value designated by the main controller 170. The recording layer 202 irradiated at the write level alters, thereby recording information.

When recording information, the aforesaid thread control or focusing control is conducted in addition to the rotation control, the tracking control and the light quantity control.

<Image Forming Operation>

Figure 14:
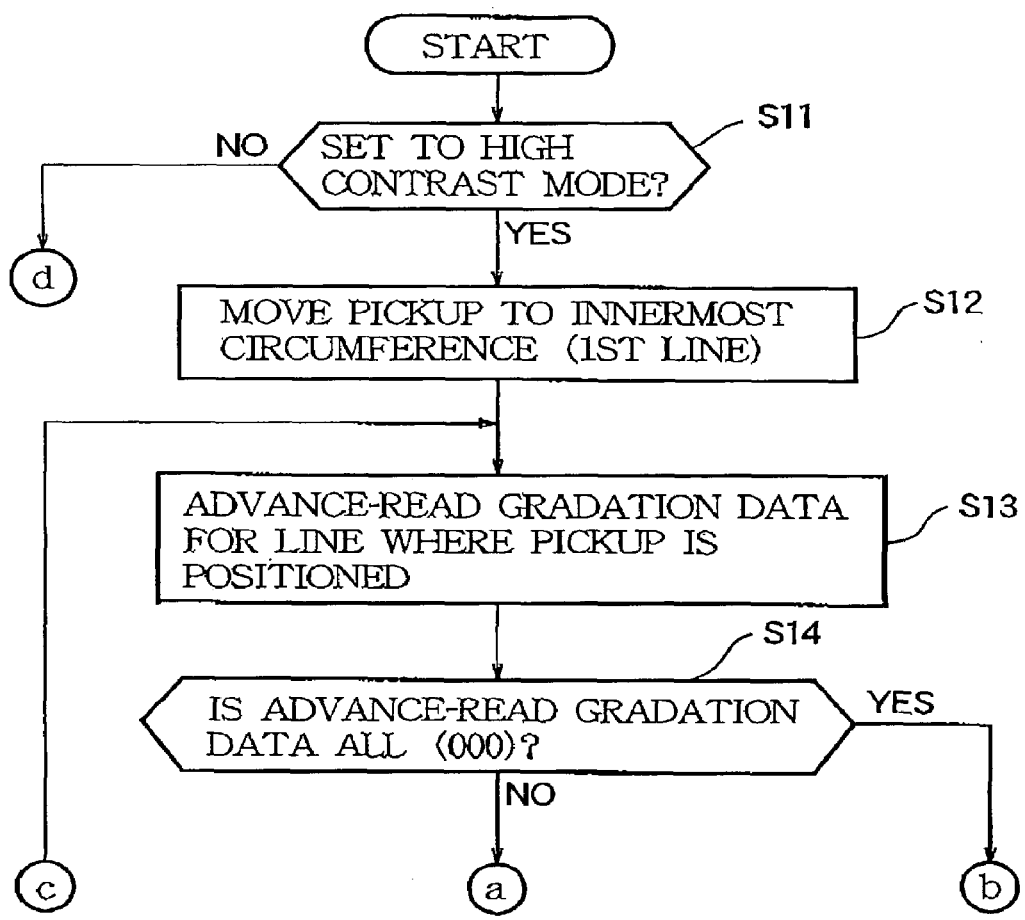
FIG. 14 is a flowchart for explaining an operation for forming an image in the optical disc recording apparatus.
Figure 15:
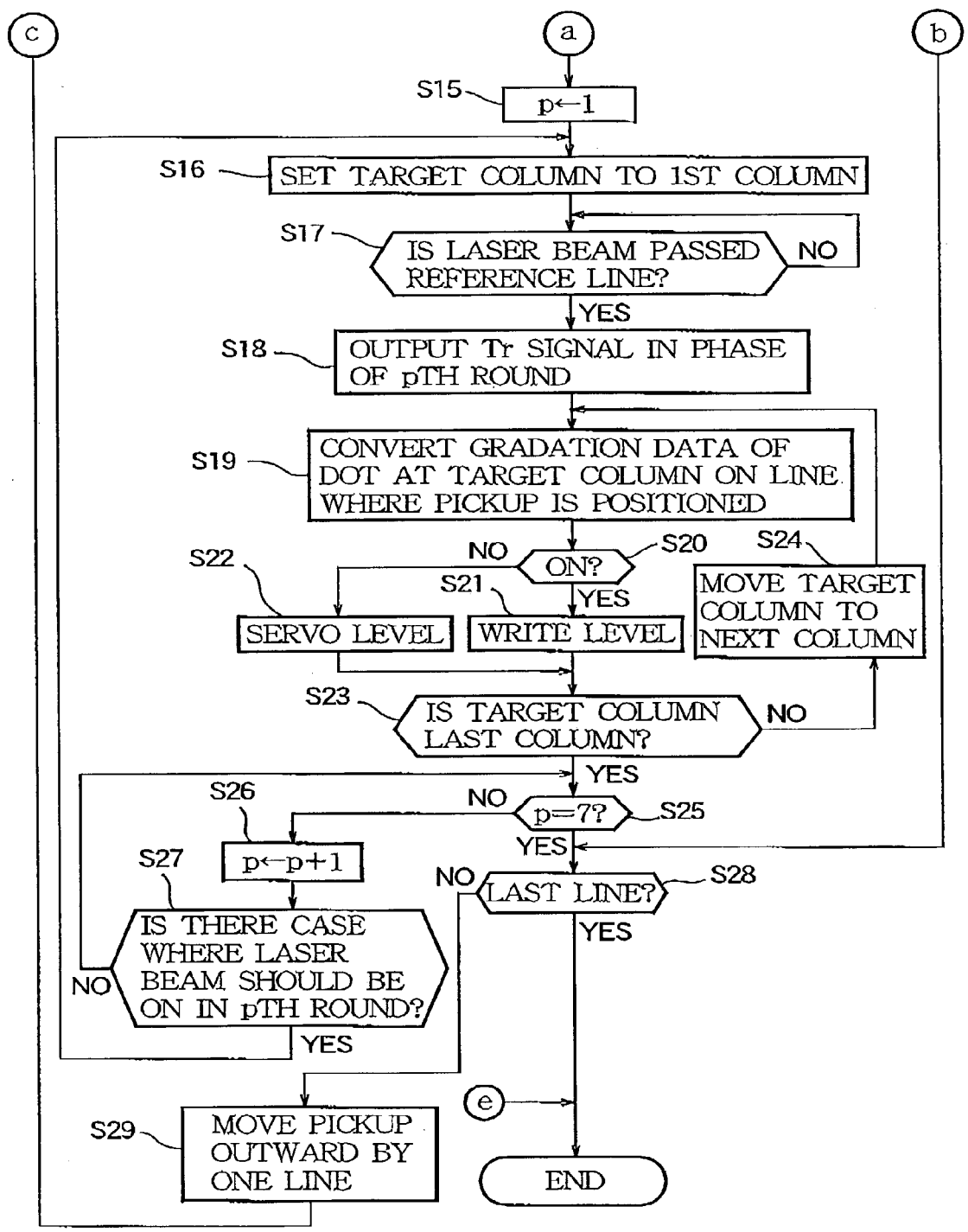
FIG. 15 is a flowchart for explaining an operation for forming an image in the optical disc recording apparatus.
Figure 16:
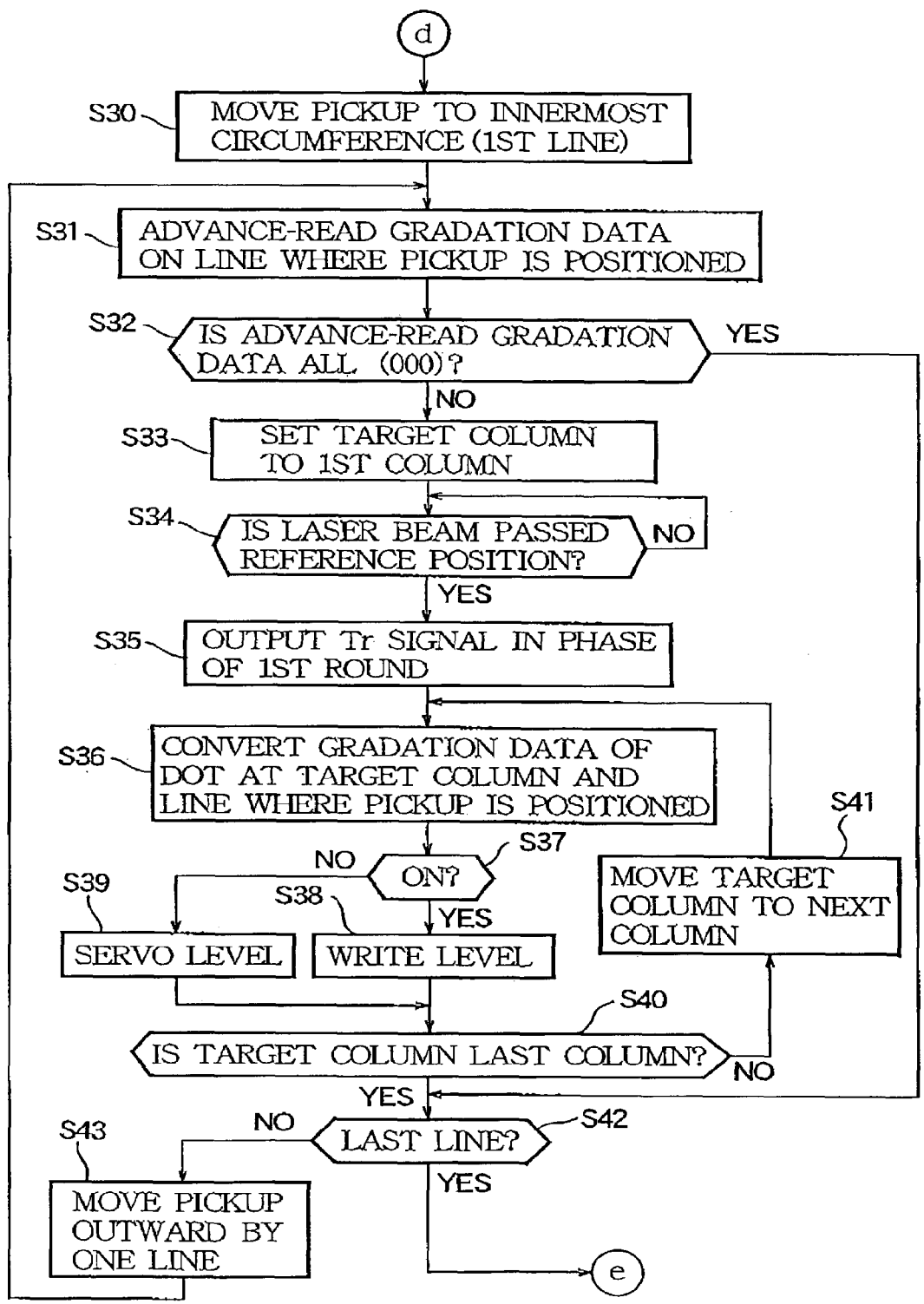
FIG. 16 is a flowchart for explaining the operation for forming an image in the optical disc recording apparatus.

The descriptions will now be given of the operation performed by the recording apparatus 10 to form an image on the optical disc 200. FIG. 14, FIG. 15 and FIG. 16 are flow charts for explaining the image forming operation.

To form an image, the optical disc 200 is set with its label face opposing the optical pickup 100, as described above. It is assumed that the image data indicating the image to be formed is supplied from the host computer and stored in the frame memory 158. When forming an image, the optical disc 200 is constantly placed under the focusing control, the light amount control and the rotation control, whereas the tracking control for tracing the land 202b is set to be invalid and not carried out, as described above.

<Contrast Priority Mode>

First, the main controller 170 determines whether the mode has been set to the high contrast mode before actually forming an image (step S11). If the determination result is affirmative, then the main controller 170 outputs an instruction for moving the optical pickup 100 to a point corresponding to the innermost circumference (first line) of the optical disc 200 (step S12). In response to the instruction, the motor driver 142 generates a signal necessary to move the optical pickup 100 to that point. As the stepping motor 140 revolves on the basis of the generated signal, the optical pickup 100 actually moves to that point.

The main controller 170 reads ahead the gradation data of the line at which the optical pickup 100 is positioned among the image data stored in the frame memory 158 (step S13). When step S13 is carried out for the first time, all the gradation data of the first line, which is the innermost circumference, of the optical disc 200 is advance-read.

Then, the main controller (the first determining section) 170 determines whether all the gradation data of the line that has been advance-read is (000)(step S14). If all the gradation data of the line is (000), it section that it is not required to color the thermo sensitive layer 205 for any one round out of the seven rounds required for forming the dots of the line.

Hence, if the determination result is affirmative, then the main controller 170 skips all the processing steps to step S28, which will be discussed hereinafter, thereby to omit the processing required for forming an n number of dots making up the line.

Meanwhile, if the determination result is negative, the main controller 170 sets a variable p to "1" (step S15). Here, the variable p is used to indicate at what number of rounds the optical pickup 100 is positioned out of the seven rounds necessary for forming the dots of the line. Hence, setting "1" at the variable p indicates the first round.

Subsequently, the main controller 170 scrutinizes the first column to process the first to the last n-th column in order on the line where the optical pickup 100 is positioned (step S16). Then, the main controller 170 stands by until the reference line of the rotating optical disc 200 passes a particular position, i.e., until the rise timing of the reference signal SFG is reached (step S17).

Here, when the reference signal SFG rises, the main controller 170 instructs the servo circuit 138 to output the tracking signal Tr of the phase equivalent to the round number indicated by the variable p (step S18). This causes the servo circuit 138 to start outputting the tracking signal Tr if the phase corresponding to the round number indicated by the variable p. Actually, therefore, the light beam of the optical pickup 100 starts librating in the radial direction of the optical disc 200 while tracing the track corresponding to the variable p among tracks Lq-1 to Lq-7 shown in FIG. 10(a). For example, if the variable p is "1", then the light beam traces the track Lq-1 of the optical disc 200.

The following series of processing from step S19 through step S24 is carried out in synchronization with one cycle of the clock signal Dck while the foregoing tracking signal Tr is being generated.

More specifically, the main controller 170 reads from the frame memory 158 the gradation data of the dots corresponding to the target column of the line where the optical pickup 100 is currently positioned. Alternatively, of the gradation data for one line that has been advance-read, the data corresponding to the dots in the line and column may be output. Thus, the gradation data is converted by the data converter 160 into the ON data for setting the intensity of a laser beam to the write level or the OFF data for setting it to the servo level according to the round number indicated by the variable p (step S19).

The laser driver 164 discriminates the converted data (step S20) and outputs the drive signal Li corresponding to the write level only if the data is the ON data (step S21). This causes the laser diode 102 in the optical pickup 100 to emit light at the write level, thus coloring only the track portion corresponding to the round number indicated by the variable p among the dots in the line opposing the optical pickup 100 and corresponding to the column currently in interest in the thermo sensitive layer 205 of the optical disc 200.

Meanwhile, the laser driver 164 outputs the drive signal Li corresponding to the servo level if the converted data is the OFF data or in a non-ON data case, such as when no converted data is supplied (step S22). Thus, the laser diode 102 in the optical pickup 100 emits light at the servo level, so that the thermo sensitive layer 205 is not colored.

Thereafter, the main controller 170 determines whether the target columned is the last n-th column (step S23), and if the determination result is negative, then moves to the next column (step S24). Then, the similar processing is repeated on the new column. Thus, the processing is repeatedly carried out up to the last n-th column so that the laser beam is radiated along the track of the round number corresponding to the variable p on the line where the optical pickup 100, is positioned.

As described above, one cycle of the repetitive processing is synchronized with one cycle of the clock signal Dck, as discussed above. Hence, the laser beam is radiated according to the ON data or OFF data converted on the basis of the line and round number each time the optical disc 200 rotates for the angle corresponding to one dot from the reference line.

Meanwhile, If the main controller 170 determines that the target column is the last n-th column, then it further determines whether the current variable p is "7" (step S25), and if the determination result is negative, then it increments the variable p by "1" (step S26) to prepare for the next round.

Furthermore, the main controller (a second determining section) 170 scrutinizes the gradation data for one line that has been advance-read to determine whether the laser beam should be radiated at the write level for the round indicated by the variable p after the increment (step S27).

When, for example, the variable p following the increment is "4", if, for instance, the gradation data for one line is all (011) or less, then it can be determined that there is no case where the laser beam should be radiated at the write level for the fourth round, referring to FIG. 12. It can be also determined that there is a case where the laser beam should be radiated at the write level for that particular round it there is gradation data of (100) or more for even a single dot.

If the determination result in step S27 is negative, then the processing procedure returns to step S25 again to determine whether the variable p after increment is "7." As in the case of this embodiment, when the converted data in the data converter 160 is as shown in FIG. 12, if the determination result in step S27 is switched to negative when the variable p in a certain line is a value α (α being an integer satisfying 2≦α<7), then the determination result will continue to be negative until the variable p becomes "7."

On the other hand, if the determination result in step S27 is affirmative, then the processing procedure returns to step S16 again. Thus, the processing from step S16 to step S25 will be implemented based on the round indicated by the variable p after increment.

Furthermore, if the main controller 170 determines in step S25 that the variable p is "7" or if the determination result in step S14 is affirmative, then it further determines whether the line on which the optical pickup 100 is positioned is the last m-th line (step S28). If the determination result is negative, then the main controller 170 issues an instruction for moving the optical pickup 100 for the distance corresponding to one line on the optical disc 200, i.e., the minimum movement resolution of the optical pickup 100 by the stepping motor 140, to a point on the outer circumference side (step S29). This instruction causes the motor driver 142 to generate a signal necessary for moving the optical pickup 100 to that point. The stepping motor 140 rotates according to the signal, thus actually moving the optical pickup 100 to the point. Thereafter, the processing procedure returns to step S13 again. In this way, the processing from step S13 to step S28 is carried out on the line following the movement of the optical pickup 100.

Meanwhile, if it is determined that the line where the optical pickup 100 is positioned is the last m-th line, then it section that the formation of the image of the first line to the last m-th line on the set optical disc 200 has been completed. The main controller 170, therefore, terminates the formation of the image, and carries out, for example, ejection processing (not shown) for ejecting the optical disc 200, as necessary.

Thus, according to this embodiment, in the high contrast mode, the image for one line (one round) is formed on the optical disc 200 by overwriting seven rounds, each round tracing a different laser beam irradiation trajectory. For the seven rounds, the number of overwriting times is increased as the density level indicated by the gradation data increases.

In this embodiment, prior to one-line overwriting, the gradation data for the one line is scrutinized. If all the gradation data for the one line is (000), i.e., if there is no need to radiate a laser beam at the write level for any one of the seven rounds required for forming the image of the one line, then the optical pickup 100 is immediately moved outward for one line without actually rotating the optical disc 200 for seven rounds. More specifically, if the determination result in step S14 is affirmative, then the processing procedure skips over to step S28, and if the determination result in step S28 is negative, then the processing in step S29 is carried out. Hence, the processing is omitted for the line requiring no image formation (no coloration on the thermo sensitive layer 205), so that the time required for forming an image can be reduced.

In the high contrast mode, it is determined beforehand whether there is a case requiring the irradiation of a laser beam at the write level in the second round and after, excluding the first round, out of the seven rounds necessary for forming the one-line image. If the determination result is negative, then the rounds thereafter are skipped. More specifically, if the determination result in step S27 is negative, then the processing procedure returns to step S25 rather than step S16. Furthermore, as in this embodiment, if the converted data in the data converter 160 is as shown in FIG. 12, once the determination result in step S27 is switched to negative, the determination result continues to be negative thereafter until the variable p reaches "7."

For instance, when the variable p in a certain line is, for example, "4" and the gradation data for this line is all (011) or less, if the determination result in step S27 changes to negative, then the determination result in step S27 continues to be negative thereafter until the variable p is incremented to "7." Therefore, the optical pickup 100 moves outwards by one line from the fourth round to the seventh round without carrying out the processing from step S16 to step S24.

Thus, the processing for the rounds involving no image formation on the optical disc 200 is skipped (the rounds being skipped), resulting in a further reduced time required for forming an image due to the combination with the line skipping described above.

In the high contrast mode, the first round is excluded from the rounds to be skipped out of the seven rounds necessary for forming the one-line image. This is because skipping the first round causes the determination result in step S14 to be affirmative, so that the line is skipped.

<Quick Mode>

The descriptions will now be given of the operation for a case where the determination result in step S11 is negative, that is, the image formation mode has been set to the quick mode. In the quick mode, the image formation of one line (one round) on the optical disc 200 is implemented only by one round on the optical disc 200. Hence, in the quick mode, the processing related to the variable p does not exist, as it will be explained hereinafter, and image formation by overwriting cannot be implemented. Accordingly, in the quick mode explained here, only binary display such as ON/OFF display is possible. However, since the gradation data itself is 3-bit in this embodiment, a laser beam of the write level will be applied to color the thermo sensitive layer 205 if gradation data is other than (000), while the laser beam of the servo level will be applied so that the thermo sensitive layer 205 remains uncolored if gradation data is (000).

When the mode has been set to the quick mode, the main controller 170 outputs an instruction for moving the optical pickup 100 to a point corresponding to the innermost circumference (first line) of the optical disc 200 (step S30). This instruction causes the optical pickup 100 to move to the point, as in the case of the high contrast mode, as described, above.

Next, as in the case of the high contrast mode, the main controller 170 reads ahead the gradation data of the line at which the optical pickup 100 is positioned among the image data stored in the frame memory 158 (step S31). Then, the main controller 170 determines whether all the gradation data of the line that has been advance-read is (000)(step S32). If all the gradation data of the line is (000), it section that it is not required to color the thermo sensitive layer 205 for at all during one round required for forming the dots of the line. Accordingly, if the determination result is affirmative, the main controller 170 skips all the steps of processing procedure to step S42, which will be discussed later, omitting the processing necessary to form the n number of dots making up the line.

If, on the other hand, the determination result is negative, the main controller 170 focuses its attention on the first one column to process from the first column to the last n-th column in sequence in the line where the optical pickup 100 is positioned (step S33). The main controller 170 then stands by until the reference line of the rotating optical disc 200 passes a particular position, that is, until the rise timing of the reference signal SFG is reached (step S34).

Here, when the reference signal SFG rises, the main controller 170 instructs the servo circuit 138 to output the tracking signal Tr of the phase for the first round (step S35). This causes the servo circuit 138 to start outputting the tracking signal Tr of the phase for the first round. Actually, therefore, the light beam of the optical pickup 100 starts librating in the radial direction of the optical disc 200 while tracing the track Lq-1 shown in FIG. 10(b).

The following series of processing from step S36 through step S41 is carried out in synchronization with one cycle of the clock signal Dck. More specifically, the main controller 170 reads from the frame memory 158 the gradation data of the dots corresponding to the target column of the line where the optical pickup 100 is currently positioned. The data converter 160 converts the gradation data into the OFF data for setting the intensity of a laser beam to the servo level if the gradation data is (000) or into the ON data for setting it to the write level if the gradation data is other than (000) (step S36).

The laser driver 164 discriminates the converted data (step S37) and outputs the drive signal Li corresponding to the write level only if the data is the ON data (step S38). This causes the laser diode 102 in the optical pickup 100 to emit light at the write level, thus coloring only the track portion corresponding to the dots in the line opposing the optical pickup 100 and corresponding to the column currently in interest in the thermo sensitive layer 205 of the optical disc 200.

Meanwhile, the laser driver 164 outputs the drive signal Li corresponding to the servo level if the converted data is the OFF data or in a non-ON data case, such as when no converted data is supplied (step S39). Thus, the laser diode 102 in the optical pickup 100 emits light at the servo level, so that the thermo sensitive layer 205 is not colored.

Thereafter, the main controller 170 determines whether the target columned is the last n-th column (step S40), and if the determination result is negative, then moves to the next column (step S41). Then, the similar processing is repeated on the new column. Thus, the processing is repeatedly carried out up to the last n-th column so that the laser beam is radiated on the line where the optical pickup 100 is positioned according to the converted ON data or OFF data.

As described above, one cycle of the repetitive processing is synchronized with one cycle of the clock signal Dck, as discussed above. Hence, the laser beam is radiated according to the converted ON data or OFF data each time the optical disc 200 rotates for the angle corresponding to one dot from the reference line.

Meanwhile, if the main controller 170 determines that the target column is the last n-th column or the determination result in step S32 is affirmative, then it further determines whether the line where the optical pickup 100 is positioned is the last m-th line (step S42). If the determination result is negative, then the main controller 170 issues an instruction for moving the optical pickup 100 to a point on the outer circumference side by the distance corresponding to one line of the optical disc 200 (step S43). This instruction causes the optical pickup 100 to actually move to the point. After that, the processing procedure returns to step S31 so as to carry out the processing from step S31 to step S42 on the new line.

Meanwhile, if it is determined that the line where the optical pickup 100 is positioned is the last m-th line, it section that the formation of the images from the first line up to the last m-th line on the set optical disc 200 has been completed. Hence, the main controller 170 terminates the formation of the image.

Thus, in the quick mode, the image formation for one line (one round) on the optical disc 200 is accomplished by one writing cycle along the track Lq-1. Therefore, the time required for forming an image can be dramatically reduced although the contrast of the formed image is inferior to that formed in the high contrast mode.

Prior to one-line single writing, the gradation data for the one line is scrutinized. If all the gradation data for the one line is (000), then the optical pickup 100 is immediately moved outward for one line. More specifically, if the determination result in step S32 is affirmative, then the processing procedure skips over to step S42, and if the determination result in step S42 is negative, then the processing in step S43 is carried out. Hence, as in the case of the high contrast mode, the processing is omitted for the line requiring no image formation (no coloration on the thermo sensitive layer 205) on the optical disc 200, so that the time required for forming an image can be reduced.

<Specific Example of a Formed Image>

The following is a specific example used to explain an image formed by the recording apparatus 10.

When the mode has been set to the high contrast mode, the dots in each line are represented by repeating the overwriting for the number of times indicated by a decimal value of the gradation data. More specifically, the area corresponding to the dots in the thermo sensitive layer 205 of the optical disc 200 is subjected to a laser beam of the write level for the number of times indicated by the decimal value of the dot gradation data, the laser beam being radiated along a different track for each round. Hence, the ratio of the colored area to the dot area substantially increases as the number of irradiations at the write level increases.

Figure 18:
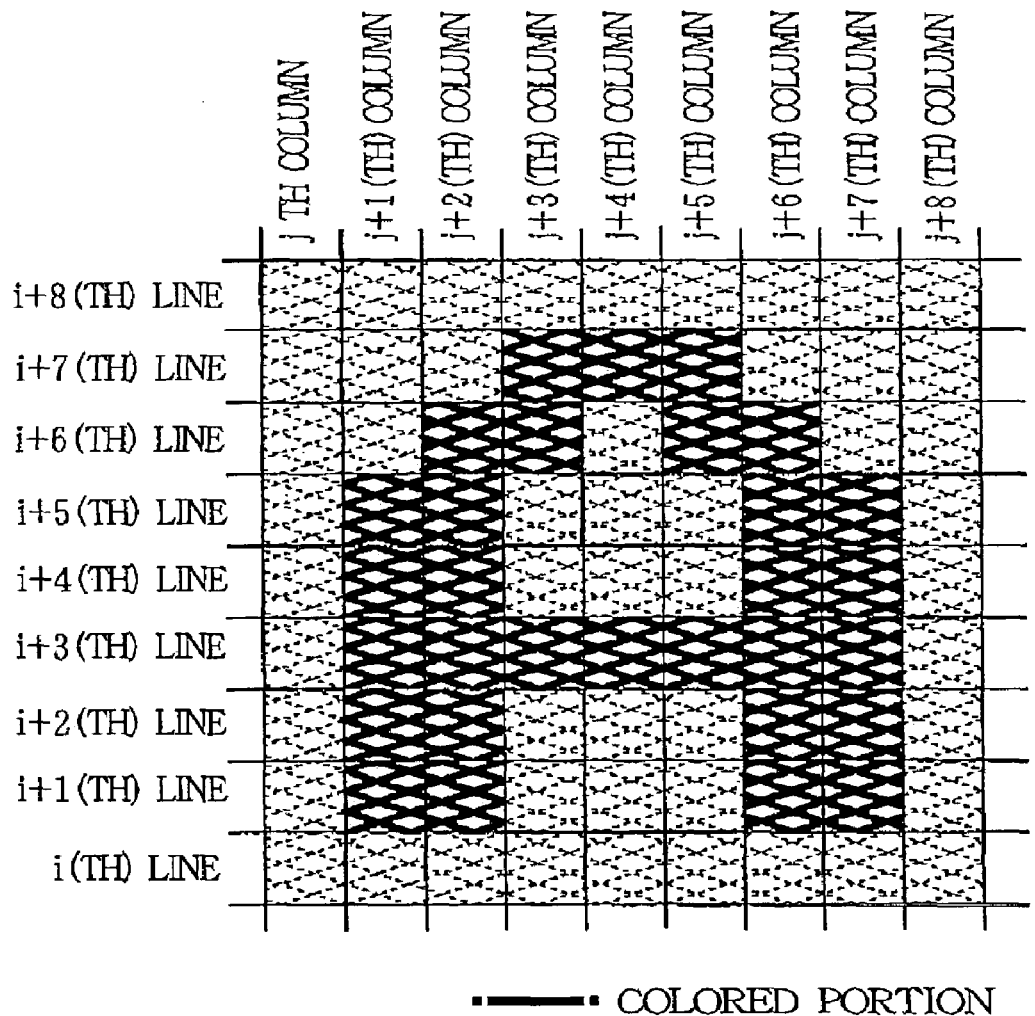
FIG. 18 is a diagram for explaining an image formed on the basis of the stored contents.

When the gradation data on which the image is formed is stored in the frame memory 158, as shown in FIG. 17, the image formed in the high contrast mode will be as shown in FIG. 18. More specifically, in the high contrast mode, for a dot whose gradation data is (111), a laser beam of the write level is radiated along a different track for each round from the first round to the seventh round. Therefore, the ratio of the area colored by the irradiation to the area of the dot will be maximum.

Figure 21:
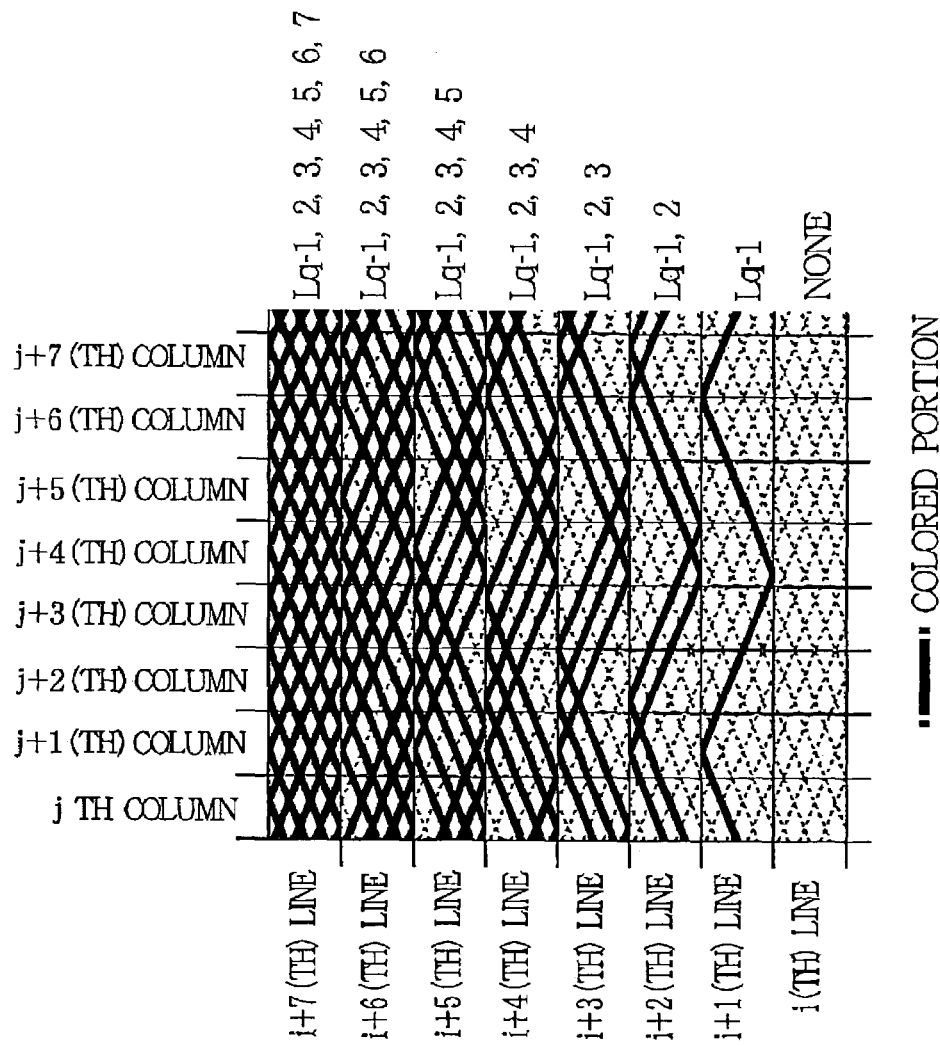
FIG. 21 is a diagram for explaining an image formed on the basis of the stored contents.

When the contents stored in the frame memory 158 is as shown in FIG. 20, the image formed in the high contrast mode will be as shown in FIG. 21. More specifically, in the high contrast mode, for a dot whose gradation data is (000), the number of times of the irradiation of a laser beam of the write level is zero, while the number of times of the irradiation of the laser beam of the write level increases 1, 2, 3, . . . , 7 as the value of the gradation data increases (001), (010), (011), . . . , (111). Hence, the ratio of the area colored due to the irradiation of the laser beam to the area of the dot gradually increases with the gradation data, eventually making it possible to form an image of eight gradations respectively corresponding to the individual pieces of 3-bit gradation data.

Figure 19:
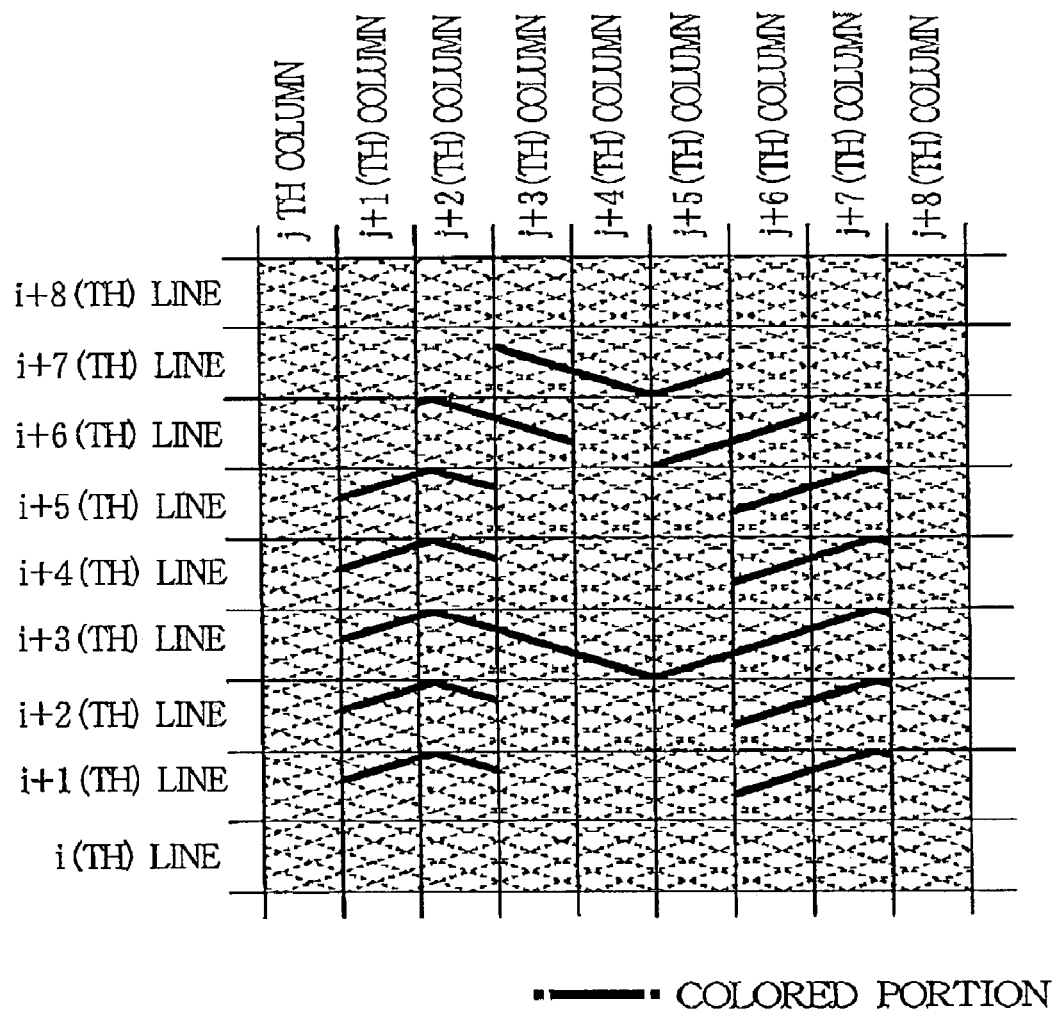
FIG. 19 is a diagram for explaining an image formed on the basis of the stored contents.

Meanwhile, when the quick mode has been set, the dots in each line are represented by one irradiation of a laser beam of the write level if the gradation data is other than (000) in this embodiment. Here, when the gradation data as shown in FIG. 17 is stored in the frame memory 158, the image formed in the quick mode will be as shown in FIG. 19. More specifically, in the quick mode, the dots whose gradation data is other than (000), will be merely expressed by the coloration caused by only one irradiation of the laser beam of the write level. Hence, the contrast ratio of a formed image degrades, as compared with the high contrast mode.

However, in the quick mode, a one-line image can be formed by just one rotation of the optical disc 200, making it possible to reduce the time required for forming an image to about one seventh, as compared with the high contrast mode, in a case where the gradation data of (111) exists for at least one dot or more in each line.

Thus, the embodiment enables a user to set the mode to the high contrast mode when he or she wishes to form an image with a high contrast ratio, or to the quick mode when he or she wishes to quickly form an image. This feature makes it possible to properly use the modes according to user's needs or various conditions, such as image quality, in forming images.

In FIG. 18 through FIG. 21, i is a symbol used for general explanation of each line from 1 to m, and j is a symbol used for general explanation of each line from 1 to n (the same being applied to FIG. 23, which will be discussed hereinafter).

<Applications and Modifications>

The present invention is not limited to the embodiment described above, and can be embodied by the following application and modification.

<Prevention of Unevenly Colored Portion>

The embodiment described above has been configured such that, when the high contrast mode has been set, gradation data is converted into the ON data or the OFF data according to the number of rounds by using the conversion table shown in FIG. 12, the converted data being continuous among adjoining rounds. Therefore, if gradation data of a certain value or more does not exist throughout one line in a certain round, then the irradiation of a laser beam from that round and after is skipped, thus making it possible to shorten the time required for forming an image accordingly However, in the above construction, the tracks of the irradiation of a write level laser beam are adjacent to each other. For instance, if the gradation data is (100), the write level laser beam traces the track Lq-1 for the first round, the track Lq-2 for the second round, the track Lq-3 for the third round and the track Lq-4 for the fourth round, respectively, as shown in FIG. 21. These tracks will be adjacent to each other both in the direction of lines and the direction of columns. Therefore, even for the same gradation data, the portion colored by the irradiation of the laser beam may have the dots concentrated on an upper side or a lower side of the colored portion, depending on the column. This may be visually recognized as a difference in display.

For example, the dots in the (i+4)th line and the (j+2)th column and the dots of the (i+4)th line and the (j+5)th column share the same gradation data (100)(refer to FIG. 20); however, the colored portions are concentrated on the upper side of a dot in the former, while they are concentrated on the lower side of a dot in the latter (refer to FIG. 21).

A conceivable application example that corrects the uneven coloration discussed above is constructed to define the conversion by the data converter 160 such that the irradiation trajectories of a write level laser beam are disposed at equal intervals as much as possible from the first round to the seventh round.

More specifically, as shown in FIG. 22, the conversion by the data converter 160 for one piece of gradation data may be carried out such that the ON data or the OFF data is disposed at equal intervals as much as possible for individual rounds. For such conversion, if the gradation data has been stored in the frame memory 158, as shown in FIG. 20, the image formed in the high contrast mode will be as shown in FIG. 23, which indicates that the uneven coloration can be restrained to a certain extent.

In addition to the above approach in which the conversion by the data converter 160 is changed, there is another approach for improving such an unevenly colored portion. The shifting amount or order of the phase of the tracking signal Tr may be changed for each round.

<Forcible Insertion of the Servo Level>

In the embodiment described above, if thick dots continue in a certain line, the write level laser beam is continuously radiated.

Meanwhile, when the write level laser beam is applied, the thermo sensitive layer 205 is colored by the energy of the laser beam. The energy used for the coloration transiently and constantly changes from the moment the irradiation is started, and also varies according to diverse conditions, including individual differences or the like of the optical disc 200. For this reason, it is considered that the return light when the write level laser beam is applied is not stabilized, easily leading to unstable focusing control.

Therefore, when the write level laser beam is continuously radiated, the focusing control may fail to normally function.

As a conceivable application example for preventing such failure, even when the write level laser beam should be continuously radiated, the servo-level laser beam may be periodically radiated for a short time (of course to an extent that does not affect the coloration) and the focusing control may be carried out by using the light receiving signal Rv in the irradiation period as a return value.

<Another Example of the Tracking Signal>

In this embodiment, the triangular wave signals have been supplied as the tracking signal Tr; however, any other type of signal can be adequately used as long as the irradiation trajectory of a laser beam crosses the groove 202a or the like of the rotating optical disc 200. Therefore, in addition to the triangular wave signals, various ac signals, including sine wave signals, may be supplied as the tracking signal Tr.

<Number of Irradiations of Laser Beam and Number of Gradations>

In the aforesaid embodiment, the number of irradiations of the laser beam for coloring the thermo sensitive layer 205 has been set to 0 to 7 to form an image with eight gradations in the high contrast mode. The number of irradiations of the laser beam may be increased as the density is increased. For example, if the gradation data is (000), (001), (010), (011), . . . , (111), the number of irradiations of the write level laser beam per line may be set to 0, 2, 4, 6, . . . , 14. Increasing the number of irradiations of the laser beam makes it possible to form images with a further higher contrast ratio. The increments of the number of irradiations need not be fixedly set.

Furthermore, the descriptions have been given by taking, as an example, the case where the image of eight gradations per dot, the gradation data being 3-bit; however, the present invention is not limited thereto. For instance, an image may be formed by 8-bit gradation data and 256 gradations.

Also in the embodiment, one line of the image has been formed by one travel (feed) of the optical pickup 100. Alternatively, however, one line of the image may be formed by repeating the feed a plurality of times. Thus, to form one line of an image by feeding the optical pickup 100 a plurality of times, e.g., 64 times, the image can be formed in 256 gradations (=4×64) by representing a density of 4 gradations per feed and changing the density for each of the 64 times of feed.

<Forming an Image With a Reduced Number of Colors in the Quick Mode>

Meanwhile, in the aforesaid embodiment, the image has been formed in the quick mode by the binary method wherein it is simply controlled to irradiate or not irradiate the write level laser beam. Alternatively, however, the number of the basic gradations indicated by gradation data may be reduced to form an image. For instance, the number of irradiations of the write level laser beam per line may be set to 0 if the gradation data is (000), (001), or one if the gradation data is (010), (011), or two if the gradation data is (100), (101), or three if the gradation data is (110), (111), carrying out three rounds per line and reducing the number of gradations to four to form the image. The irradiation trajectory of the laser beam is of course set so that it strides over the groove 202a in all three rounds and differs in each round. Thus, by reducing the original number of gradations indicated by the gradation data in forming an image, the time required for forming the image itself can be also shortened although the effect for shortening the time may be smaller than that in the high contrast mode.

When forming an image in the quick mode, the same gradation data as that in the high contrast mode has been stored in the frame memory 158. Alternatively, however, the gradation data may be processed by a host computer to store, in the frame memory 158, binary gradation data or the gradation data of a reduced number of gradations to decrease the number of colors, and an image may be formed on the basis of the gradation data in the same manner as that in the high contrast mode. This modification achieves the same advantage in that the time required for forming one line of image is shortened because the number of colors of gradation data is binary or reduced from the original number.

<CLV Method>

The aforesaid embodiment has adopted the CAV method wherein a laser beam is radiated while rotating the optical disc 200 at a predetermined angular velocity to form an image. Alternatively, a CLV method using a constant linear velocity may be adopted. Unlike the CAV method, the CLV method does not require the control for increasing the write level of a laser beam as the irradiation position of the laser beam shifts toward an outer circumference. This section that the quality of an image to be formed is not deteriorated due to the changes of the target value of laser power.

<Arrangement of Dots>

In the aforesaid embodiment, the number of columns has been set to the same m from the first line to the last m-th line. Alternatively, however, the number of columns may be increased toward an outer circumference. In other words, the number of the columns may be different in each line.

In the aforesaid embodiment, if the multiplying rate of the frequency in the PLL circuit 144 is set to a value of a quotient obtained by dividing a column number n per line by 8, then one cycle of the clock signal Dck coincides with the period of time during which the optical disc 200 rotates by the angle equivalent to one column of dot arrays. Hence, the multiplying rate of the PLL circuit 144 may be set on the basis of the number of columns for each line so as to permit an arrangement wherein the number of columns is different in each line.

As explained above, according to the present invention, even when an optical disc is set with its label face opposing an optical pickup when forming an image, focusing control can be properly carried out, making it possible to prevent deterioration in the quality of an image to be formed.

What is claimed is:

1. An optical disc recording apparatus comprising:
  a rotating section that is provided for rotating an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming an image in an array of dots arranged along circumferential zones which are defined by concentrically dividing the coloring layer;
  a light radiating section that is provided for radiating the laser beam onto the optical disc rotated by the rotating section;
  an irradiation position operating section that is provided for operating an irradiation position of the laser beam radiated onto the optical disc from the light radiating section;
  a focus operating section that is provided for operating a focus of the laser beam radiated to the optical disc from the light radiating section;
  a focus controlling section that is provided for controlling the focus operating section so as to maintain a constant spot diameter of the laser beam on the optical disc by detecting a return light of the laser beam reflected back from the optical disc;
  an irradiation position controlling section that is provided for controlling the irradiation position operating section, the irradiation position controlling section being operative when the light radiating section opposes the one surface of the optical disc for controlling the laser beam radiated by the light radiating section to track the spiral groove in the recording layer on the one surface, and being operative when the light radiating section opposes the other surface of the optical disc for controlling an irradiation trajectory of the laser beam to vibrate in a radial direction of the optical disc while the laser beam runs along the circumferential zones defined on the coloring layer;
  a laser beam intensity modulating section being operative when the light radiating section opposes the one surface of the optical disc for modulating an intensity of the laser beam on the basis of the information to be recorded, and being operative when the light radiating section opposes the other surface of the optical disc for modulating the intensity of the laser beam on the basis of the dots along the circumferential zones so as to form the image; and
  a feeding section operative when the light radiating section opposes the other surface of the optical disc for feeding the light radiating section substantially in the radial direction of the optical disc by a radial pitch of the circumferential zones to step the laser beam from one circumferential zone to another circumferential zone after the laser beam repeatedly runs the one circumferential zone a number of rounds while the optical disc is rotated by the rotating section, wherein the irradiation position controlling section variably controls the irradiation trajectory of the laser beam each round along the one circumferential zone of the optical disc such that the irradiation trajectory drawn in one round differs from that drawn in another round, and wherein the laser beam intensity modulating section modulates the intensity of the laser beam on the basis of a gradation applied to the dots to be arranged on the one circumferential zone and on the basis of the number of the rounds.

2. An optical disc recording apparatus comprising:

a rotating section that is provided for rotating an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming an image in an array of dots arranged along circumferential zones which are defined by concentrically dividing the coloring layer;

a light radiating section that is provided for radiating the laser beam onto the optical disc rotated by the rotating section;

an irradiation position operating section that is provided for operating an irradiation position of the laser beam radiated onto the optical disc from the light radiating section;

a focus operating section that is provided for operating a focus of the laser beam radiated to the optical disc from the light radiating section;

a focus controlling section that is provided for controlling the focus operating section so as to maintain a constant spot diameter of the laser beam on the optical disc by detecting a return light of the laser beam reflected back from the optical disc;

an irradiation position controlling section that is provided for controlling the irradiation position operating section, the irradiation position controlling section being operative when the light radiating section opposes the one surface of the optical disc for controlling the laser beam radiated by the light radiating section to track the spiral groove in the recording layer on the one surface, and being operative when the light radiating section opposes the other surface of the optical disc for controlling an irradiation trajectory of the laser beam to vibrate in a radial direction of the optical disc while the laser beam runs along the circumferential zones defined on the coloring layer;

a laser beam intensity modulating section being operative when the light radiating section opposes the one surface of the optical disc for modulating an intensity of the laser beam on the basis of the information to be recorded, and being operative when the light radiating section opposes the other surface of the optical disc for modulating the intensity of the laser beam on the basis of the dots along the circumferential zones so as to form the image; and a feeding section operative when the light radiating section opposes the other surface of the optical disc for feeding the light radiating section substantially in the radial direction of the optical disc by a radial pitch of the circumferential zones to step the laser beam from one circumferential zone to another circumferential zone after the laser beam repeatedly runs the one circumferential zone a number of rounds while the optical disc is rotated by the rotating section, wherein the irradiation position controlling section variably controls the irradiation trajectory of the laser beam each round along the one circumferential zone of the optical disc such that the irradiation trajectory drawn in one round differs from that drawn in another round, wherein the laser beam intensity modulating section modulates the intensity of the laser beam on the basis of a gradation applied to the dots to be arranged on the one circumferential zone and on the basis of the number of the rounds, wherein the irradiation position operating section operates the irradiation position of the laser beam according to a tracking signal having an amplitude, a frequency and a phase, and wherein the irradiation position controlling section generates the tracking signal having a fixed amplitude, a fixed frequency and a variable phase such that the irradiation trajectory of the laser beam vibrates in correspondence to the fixed frequency of the tracking signal in the radial direction of the optical disc by the fixed amplitude, while the irradiation trajectory of the laser beam differs each round according to the variable phase of the tracking signal.

3. An optical disc recording apparatus comprising:

a rotating section that is provided for rotating an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming an image in an array of dots arranged along circumferential zones which are defined by concentrically dividing the coloring layer;

a light radiating section that is provided for radiating the laser beam onto the optical disc rotated by the rotating section;

an irradiation position operating section that is provided for operating an irradiation position of the laser beam radiated onto the optical disc from the light radiating section;

a focus operating section that is provided for operating a focus of the laser beam radiated to the optical disc from the light radiating section;

a focus controlling section that is provided for controlling the focus operating section so as to maintain a constant spot diameter of the laser beam on the optical disc by detecting a return light of the laser beam reflected back from the optical disc;

an irradiation position controlling section that is provided for controlling the irradiation position operating section, the irradiation position controlling section being operative when the light radiating section opposes the one surface of the optical disc for controlling the laser beam radiated by the light radiating section to track the spiral groove in the recording layer on the one surface, and being operative when the light radiating section opposes the other surface of the optical disc for controlling an irradiation trajectory of the laser beam to vibrate in a radial direction of the optical disc while the laser beam runs along the circumferential zones defined on the coloring layer; and a laser beam intensity modulating section being operative when the light radiating section opposes the one surface of the optical disc for modulating an intensity of the laser beam on the basis of the information to be recorded, and being operative when the light radiating section opposes the other surface of the optical disc for modulating the intensity of the laser beam on the basis of the dots along the circumferential zones so as to form the image, wherein the light radiating section repeatedly radiates the laser beam onto the dot to progressively change the color of the dot through a number of the rounds, and wherein the laser beam intensity modulating section modulates the intensity of the laser beam during the number of the rounds on the basis of the gradation of the dot such that the color brightness of the dot increases as a density of the gradation of the dot increases.

4. An optical disc recording apparatus having at least a first mode for placing a higher priority to a gradation degree of the image to be formed and a second mode for placing a higher priority to reduction of time required for forming the image, said apparatus comprising:

a rotating section that is provided for rotating an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming an image in an array of dots arranged along circumferential zones which are defined by concentrically dividing the coloring layer;

a light radiating section that is provided for radiating the laser beam onto the optical disc rotated by the rotating section;

an irradiation position operating section that is provided for operating an irradiation position of the laser beam radiated onto the optical disc from the light radiating section;

a focus operating section that is provided for operating a focus of the laser beam radiated to the optical disc from the light radiating section;

a focus controlling section that is provided for controlling the focus operating section so as to maintain a constant spot diameter of the laser beam on the optical disc by detecting a return light of the laser beam reflected back from the optical disc;

an irradiation position controlling section that is provided for controlling the irradiation position operating section, the irradiation position controlling section being operative when the light radiating section opposes the one surface of the optical disc for controlling the laser beam radiated by the light radiating section to track the spiral groove in the recording layer on the one surface, and being operative when the light radiating section opposes the other surface of the optical disc for controlling an irradiation trajectory of the laser beam to vibrate in a radial direction of the optical disc while the laser beam runs along the circumferential zones defined on the coloring layer;

a laser beam intensity modulating section being operative when the light radiating section opposes the one surface of the optical disc for modulating an intensity of the laser beam on the basis of the information to be recorded, and being operative when the light radiating section opposes the other surface of the optical disc for modulating the intensity of the laser beam on the basis of the dots along the circumferential zones so as to form the image; and a feeding section operative when the light radiating section opposes the other surface of the optical disc for feeding the light radiating section substantially in the radial direction of the optical disc by a radial pitch of the circumferential zones to step the laser beam from one circumferential zone to another circumferential zone after the laser beam repeatedly runs the one circumferential zone a number of rounds while the optical disc is rotated by the rotating section, wherein the irradiation position controlling section variably controls the irradiation trajectory of the laser beam each round along the one circumferential zone of the optical disc such that the irradiation trajectory drawn in one round differs from that drawn in another round, wherein the laser beam intensity modulating section modulates the intensity of the laser beam on the basis of a gradation applied to the dots to be arranged on the one circumferential zone and on the basis of the number of the rounds, and wherein the irradiation position controlling section operates under the second mode for reducing the number of the rounds allotted to one circumferential zone such that the time required for forming the image is reduced as compared with the first mode while the gradation degree of the image is lowered as compared with the first mode.

5. An optical disc recording apparatus comprising:

a rotating section that is provided for rotating an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming an image in an array of dots arranged along circumferential zones which are defined by concentrically dividing the coloring layer;

a light radiating section that is provided for radiating the laser beam onto the optical disc rotated by the rotating section;

an irradiation position operating section that is provided for operating an irradiation position of the laser beam radiated onto the optical disc from the light radiating section;

a focus operating section that is provided for operating a focus of the laser beam radiated to the optical disc from the light radiating section;

a focus controlling section that is provided for controlling the focus operating section so as to maintain a constant spot diameter of the laser beam on the optical disc by detecting a return light of the laser beam reflected back from the optical disc;

an irradiation position controlling section that is provided for controlling the irradiation position operating section, the irradiation position controlling section being operative when the light radiating section opposes the one surface of the optical disc for controlling the laser beam radiated by the light radiating section to track the spiral groove in the recording layer on the one surface, and being operative when the light radiating section opposes the other surface of the optical disc for controlling an irradiation trajectory of the laser beam to vibrate in a radial direction of the optical disc while the laser beam runs along the circumferential zones defined on the coloring layer;

a laser beam intensity modulating section being operative when the light radiating section opposes the one surface of the optical disc for modulating an intensity of the laser beam on the basis of the information to be recorded, and being operative when the light radiating section opposes the other surface of the optical disc for modulating the intensity of the laser beam on the basis of the dots along the circumferential zones so as to form the image; and a determining section for determining whether it is necessary to radiate the laser beam having the intensity that causes the coloring layer to change its color during a number of the rounds while the optical disc is rotated by the rotating section for the number of the rounds to form dots along a target circumferential zone, the determining section being operative if the determination result is negative for instructing the feeding section to immediately feed the light radiating section to skip the target circumferential zone without waiting for the optical disc to rotate for the number of the rounds.

6. An optical disc recording apparatus comprising:

a rotating section that is provided for rotating an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming an image in an array of dots arranged along circumferential zones which are defined by concentrically dividing the coloring layer;

a light radiating section that is provided for radiating the laser beam onto the optical disc rotated by the rotating section;

an irradiation position operating section that is provided for operating an irradiation position of the laser beam radiated onto the optical disc from the light radiating section;

a focus operating section that is provided for operating a focus of the laser beam radiated to the optical disc from the light radiating section;

a focus controlling section that is provided for controlling the focus operating section so as to maintain a constant spot diameter of the laser beam on the optical disc by detecting a return light of the laser beam reflected back from the optical disc;

an irradiation position controlling section that is provided for controlling the irradiation position operating section, the irradiation position controlling section being operative when the light radiating section opposes the one surface of the optical disc for controlling the laser beam radiated by the light radiating section to track the spiral groove in the recording layer on the one surface, and being operative when the light radiating section opposes the other surface of the optical disc for controlling an irradiation trajectory of the laser beam to vibrate in a radial direction of the optical disc while the laser beam runs along the circumferential zones defined on the coloring layer;

a laser beam intensity modulating section being operative when the light radiating section opposes the one surface of the optical disc for modulating an intensity of the laser beam on the basis of the information to be recorded, and being operative when the light radiating section opposes the other surface of the optical disc for modulating the intensity of the laser beam on the basis of the dots along the circumferential zones so as to form the image; and a determining section for determining whether it is necessary to radiate the laser beam having the intensity that causes the coloring layer to change its color in a current round while the optical disc makes the current round by the rotating section to form dots along a circumferential zone, the determining section being operative if the determination result is negative for canceling the radiation of the laser beam for the current round on which the determination result is negative.

7. A method of forming an image on an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming the image in an array of dots arranged along circumferential zones which are defined by concentrically dividing the coloring layer, the method comprising the steps of:

rotating the optical disc with the other surface opposing an optical pickup that radiates the laser beam;

controlling an irradiation trajectory of the laser beam to vibrate in a radial direction of the optical disc while the laser beam runs along the circumferential zones defined on the coloring layer;

controlling a focus of the laser beam to be constant relative to the other surface of the optical disc;

modulating an intensity of the laser beam on the basis of the dots to be arranged along the circumferential zones of the optical disc so as to form the image;

stepping the laser beam from one circumferential zone to another circumferential zone after the laser beam repeatedly runs the one circumferential zone a number of rounds while the optical disc is rotated; and variably controlling the irradiation trajectory of the laser beam each round along the one circumferential zone of the optical disc such that the irradiation trajectory drawn in one round differs from that drawn in another round, and wherein the intensity of the laser beam is modulated on the basis of a gradation applied to the dots to be arranged on the one circumferential zone and on the basis of the number of the rounds.

8. A machine readable medium for use in a recording apparatus of an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming a image in an array of dots arranged along circumferential zones which are defined by concentrically dividing the coloring layer, the medium containing a program executable by a CPU of the recording apparatus to perform a method of forming an image on the optical disc, wherein the method comprising the steps of:

rotating the optical disc with the other surface opposing an optical pickup that radiates the laser beam;

controlling an irradiation trajectory of the laser beam to vibrate in a radial direction of the optical disc while the laser beam runs along the circumferential zones defined on the coloring layer;

controlling a focus of the laser beam to be constant relative to the other surface of the optical disc;

modulating an intensity of the laser beam on the basis of the dots to be arranged along the circumferential zones of the optical disc so as to form the image;

stepping the laser beam from one circumferential zone to another circumferential zone after the laser beam repeatedly runs the one circumferential zone a number of rounds while the optical disc is rotated; and variably controlling the irradiation trajectory of the laser beam each round along the one circumferential zone of the optical disc such that the irradiation trajectory drawn in one round differs from that drawn in another round, and wherein the intensity of the laser beam is modulated on the basis of a gradation applied to the dots to be arranged on the one circumferential zone and on the basis of the number of the rounds.

9. An optical disc recording apparatus comprising:

a rotating section that is provided for rotating an optical disc having a recording layer on one surface of the optical disc and a coloring layer on the other surface of the optical disc, the recording layer being formed with a spiral groove for recording information by radiating a laser beam, the coloring layer having a color changeable in response to heat or light of a laser beam for forming an image;

a light radiating section that is provided for radiating the laser beam onto the optical disc rotated by the rotating section;

an irradiation position operating section that is provided for operating an irradiation position of the laser beam radiated from the light radiating section in a radial direction of the optical disc;

a feeding section that is provided for feeding the light radiating section in the radial direction of the optical disc;

a focus operating section that is provided for operating a focus of the laser beam radiated to the optical disc from the light radiating section;

a focus controlling section that is provided for controlling the focus operating section so as to maintain a constant spot diameter of the laser beam on the optical disc by detecting a return light of the laser beam reflected back from the optical disc;

an irradiation position controlling section that is provided for controlling the irradiation position operating section and the feed section to operate the irradiation position of the laser beam radiated onto the optical disc from the light radiating section, the irradiation position controlling section being operative when the light radiating section opposes the one surface of the optical disc for controlling the laser beam radiated by the light radiating section to track the spiral groove in the recording layer on the one surface, and being operative when the light radiating section opposes the other surface of the optical disc for controlling the irradiation position operating section so as to vibrate an irradiating trajectory of the laser beam in a radial direction of the optical disc while the optical disc is rotated to form the image on the coloring layer; and a laser beam intensity modulating section being operative when the light radiating section opposes the one surface of the optical disc for modulating an intensity of the laser beam on the basis of the information to be recorded, and being operative when the light radiating section opposes the other surface of the optical disc for modulating the intensity of the laser beam on the basis of image data representing the image to be formed on the optical disc, wherein, when image formation operation on the optical disc by the light radiating section is performed, the feeding section fixes the light radiating section in a prescribed radial position while the optical disc is rotated by X number of rotations and feeds the light radiating section in the radial direction of the optical disc by a radial pitch after the optical disc is rotated by X number of rotations, wherein X is a predetermined number greater than one, and wherein the irradiation position controlling section variably controls the irradiation trajectory of the laser beam for each rotation of the optical disc such that the irradiation trajectory drawn in one rotation of the optical disc differs from that drawn in another rotation of the optical disc.

10. An optical disc recording apparatus comprising:

a rotating section that is provided for rotating an optical disc having a coloring layer on one of the surfaces of the optical disc, the coloring layer having a color changeable in response to heat or light of a laser beam for forming an image;

a light radiating section that is provided for radiating the laser beam onto the optical disc rotated by the rotating section;

an irradiation position operating section that is provided for operating an irradiation position of the laser beam radiated from the light radiating section in a radial direction of the optical disc;

a feeding section that is provided for feeding the light radiating section in the radial direction of the optical disc;

a focus operating section that is provided for operating a focus of the laser beam radiated to the optical disc from the light radiating section;

a focus controlling section that is provided for controlling the focus operating section so as to maintain a constant spot diameter of the laser beam on the optical disc by detecting a return light of the laser beam reflected back from the optical disc;

an irradiation position controlling section that is provided for controlling the irradiation position operating section and the feed section to operate the irradiation position of the laser beam radiated onto the optical disc from the light radiating section, the irradiation position controlling section for controlling the irradiation position operating section so as to vibrate an irradiating trajectory of the laser beam in a radial direction of the optical disc while the optical disc is rotated to form the image on the coloring layer; and a laser beam intensity modulating section for modulating the intensity of the laser beam on the basis of image data representing the image to be formed on the optical disc, wherein, when image formation operation on the optical disc by the light radiating section is performed, the feeding section fixes the light radiating section in a prescribed radial position while the optical disc is rotated by X number of rotations and feeds the light radiating section in the radial direction of the optical disc by a radial pitch after the optical disc is rotated by X number of rotations, wherein X is a predetermined number greater than one, and wherein the irradiation position controlling section variably controls the irradiation trajectory of the laser beam for each rotation of the optical disc such that the irradiation trajectory drawn in one rotation of the optical disc differs from that drawn in another rotation of the optical disc.

11. An optical disc recording apparatus comprising:
a rotating section that is provided for rotating an optical disc having a coloring layer on one of the surfaces of the optical disc, the coloring layer having a color changeable in response to heat or light of a laser beam for forming an image;
a light radiating section that is provided for radiating the laser beam onto the optical disc rotated by the rotating section in a radial direction of the optical disc;
an irradiation position operating section that is provided for operating an irradiation position of the laser beam radiated from the light radiating section in a radial direction of the optical disc;
a feeding section that is provided for feeding the light radiating section in the radial direction of the optical disc;
an irradiation position controlling section that is provided for controlling the irradiation position operating section and the feed section to operate the irradiation position of the laser beam radiated onto the optical disc from the light radiating section, the irradiation position controlling section for controlling the irradiation position operating section so as to vibrate an irradiating trajectory of the laser beam in a radial direction of the optical disc while the optical disc is rotated to form the image on the coloring layer; and
a laser beam intensity modulating section being operative for modulating the intensity of the laser beam on the basis of image data representing the image to be formed on the optical disc,
wherein, when image formation operation on the optical disc by the light radiating section is performed, the feeding section fixes the light radiating section in a prescribed radial position while the optical disc is rotated by X number of rotations and feeds the light radiating section in the radial direction of the optical disc by a radial pitch after the optical disc is rotated by X number of rotations, wherein X is a predetermined number greater than one, and
wherein the irradiation position controlling section variably controls the irradiation trajectory of the laser beam for each rotation of the optical disc such that the irradiation trajectory drawn in one rotation of the optical disc differs from that drawn in another rotation of the optical disc.

12. An optical disc recording apparatus for performing image formation on an optical disc by irradiating a laser beam, the optical disc having a coloring layer on one of the surfaces thereof, the coloring layer having a color changeable in response to heat or light of the laser beam, the optical disc recording apparatus comprising:
a spindle motor that rotates the optical disc;
an optical pickup that radiates a laser beam through an object lens onto the optical disc rotated by the rotating section on a basis of image data representing an image to be formed on the optical disc;
a tracking actuator that moves the object lens to operate an irradiation position of the laser beam radiated from the optical pickup in a radial direction of the optical disc;
a stepping motor that feeds the optical pickup in the radial direction of the optical disc; and
a controller that controls the tracking actuator and stepping motor to operate the irradiation position of the laser beam radiated onto the optical disc from the optical pickup, the controller being operative for controlling the tracking actuator so as to vibrate an irradiation trajectory of the laser beam in a radial direction of the optical disc while the optical disc is rotated to form the image on the coloring layer,
wherein the stepping motor positions the optical pickup in a radial position while the optical disc is rotated by X number of rotations, and then feeds the optical pickup in the radial direction of the optical disc by a radial pitch from the radial position after the optical disc is rotated the by X number of rotations, wherein X is a predetermined number greater than one, and
wherein the controller variably controls the irradiation trajectory of the laser beam each rotation of the optical disc such that the irradiation trajectory drawn in one rotation of the optical disc differs from that drawn in another rotation of the optical disc.

13. An optical disc recording system for performing image formation on an optical disc by irradiating a laser beam, said system comprising:
an optical disc having a coloring layer on one of the surfaces thereof, the coloring layer having a color changeable in response to heat or light of the laser beam;
a rotating section for rotating the optical disc;
a light radiating section for radiating the laser beam onto the optical disc rotated by the rotating section;
an irradiation position operating section for operating an irradiation position of the laser beam radiated from the light radiating section in a radial direction of the optical disc;
a feeding section that is provided for feeding the light radiating section in the radial direction of the optical disc;
an irradiation position controlling section for controlling the irradiation position operating section and the feed section to operate the irradiation position of the laser beam radiated onto the optical disc from the light radiating section, the irradiation position controlling section being operative for controlling the irradiation position operating section so as to vibrate an irradiation trajectory of the laser beam in a radial direction of the optical disc while the optical disc is rotated to form the image on the coloring layer; and
a laser beam intensity modulation section for modulating the intensity of the laser beam on the basis of image data representing the image to be formed on the optical disc,
wherein, when image formation operation on the optical disc by the light radiating section is performed, the feeding section positions the light radiating section in a prescribed radial position while the optical disc is rotated by X number of rotations and feeds the light radiating section in the radial direction of the optical disc by a radial pitch after the optical disc is rotated by X number of rotations, wherein X is a predetermined number greater than one, and
wherein the irradiation position controlling section variably controls the irradiation trajectory of the laser beam each rotation of the optical disc such that the irradiation trajectory drawn in one rotation of the optical disc differs from that drawn in another rotation of the optical disc.

* * * * *